(12) United States Patent
Kawakubo

(10) Patent No.: US 10,451,317 B2
(45) Date of Patent: Oct. 22, 2019

(54) REFRIGERATION CYCLE DEVICE

(71) Applicant: DENSO CORPORATION, Kariya, Aichi-pref. (JP)

(72) Inventor: Masaaki Kawakubo, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 204 days.

(21) Appl. No.: 15/536,583

(22) PCT Filed: Dec. 8, 2015

(86) PCT No.: PCT/JP2015/006085
§ 371 (c)(1),
(2) Date: Jun. 15, 2017

(87) PCT Pub. No.: WO2016/103599
PCT Pub. Date: Jun. 30, 2016

(65) Prior Publication Data
US 2017/0350624 A1     Dec. 7, 2017

(30) Foreign Application Priority Data
Dec. 25, 2014    (JP) ................. 2014-263151

(51) Int. Cl.
*F25B 6/04*       (2006.01)
*F25B 43/02*      (2006.01)
(Continued)

(52) U.S. Cl.
CPC .......... *F25B 6/04* (2013.01); *B60H 1/00921* (2013.01); *B60H 1/3227* (2013.01); *F25B 5/00* (2013.01);
(Continued)

(58) Field of Classification Search
CPC .. B60H 1/00921; F25B 43/02; F25B 2400/02; F25B 6/04; F25B 5/04; F25B 31/002; F25B 31/004
See application file for complete search history.

(56) References Cited

U.S. PATENT DOCUMENTS 5,987,914 A * 11/1999 Sumida ................. F25B 31/002
62/468
2002/0023448 A1* 2/2002 Ito ............................. F25B 6/04
62/222
(Continued)

FOREIGN PATENT DOCUMENTS

JP        H07208833 A    8/1995
JP        H0908416 A     4/1997
(Continued)

*Primary Examiner* — Orlando E Aviles
(74) *Attorney, Agent, or Firm* — Harness, Dickey & Pierce, P.L.C.

(57) ABSTRACT

A refrigeration cycle device is configured to be selectively switchable between an air-cooling first refrigerant circuit that causes refrigerant to flow out of a liquid-phase refrigerant outlet of a gas-liquid separator, and an air-heating second refrigerant circuit that causes the refrigerant to flow out of a gas-phase refrigerant outlet of the gas-liquid separator. In the refrigeration cycle device, an oil separator is disposed in a refrigerant passage that leads from a heat dissipation device to a first expansion valve. Thus, when the first refrigerant circuit is configured in the refrigeration cycle device, the refrigerant passing through the oil separator is in a single gas phase or in an almost gas phase, so that oil can be easily separated from the refrigerant. Furthermore, when the refrigerant circulates through the first refrigerant circuit, oil can be retained at a position other than the gas-liquid separator.

6 Claims, 7 Drawing Sheets

(51) Int. Cl.
*B60H 1/00* (2006.01)
*B60H 1/32* (2006.01)
*F25B 41/04* (2006.01)
*F25B 49/02* (2006.01)
*F25B 5/00* (2006.01)
*F25B 39/02* (2006.01)
*F25B 40/02* (2006.01)

(52) U.S. Cl.
CPC .......... *F25B 39/028* (2013.01); *F25B 41/043* (2013.01); *F25B 43/02* (2013.01); *F25B 49/02* (2013.01); *F25B 40/02* (2013.01); *F25B 2309/061* (2013.01); *F25B 2339/044* (2013.01); *F25B 2339/047* (2013.01); *F25B 2339/0444* (2013.01); *F25B 2341/0662* (2013.01); *F25B 2400/02* (2013.01); *F25B 2400/0403* (2013.01); *F25B 2400/0409* (2013.01); *F25B 2600/2501* (2013.01); *F25B 2600/2507* (2013.01)

(56) References Cited

U.S. PATENT DOCUMENTS

2009/0241573 A1\* 10/2009 Ikegami .................. F25B 39/04
  62/238.7
2013/0312447 A1\* 11/2013 Inaba .................. B60H 1/00921
  62/324.6

FOREIGN PATENT DOCUMENTS

| JP | 2009126221 A | 6/2009 |
| JP | 2011007379 A | 1/2011 |
| JP | 4803199 B2 | 10/2011 |
| JP | 2011235753 A | 11/2011 |
| JP | 2012020599 A | 2/2012 |
| JP | 2014081159 A | 5/2014 |
| JP | 2014149123 A | 8/2014 |

\* cited by examiner

REFRIGERATION CYCLE DEVICE

CROSS REFERENCE TO RELATED APPLICATION

This application is based on Japanese Patent Application No. 2014-263151 filed on Dec. 25, 2014, the contents of which are incorporated herein by reference in its entirety.

FIELD OF THE INVENTION

The present disclosure relates to a refrigeration cycle device in which a refrigerant circulates.

BACKGROUND ART

Conventionally, this kind of refrigeration cycle device is described, for example, in Patent Document 1. The refrigeration cycle device disclosed in Patent Document 1 includes a gas-liquid separator and a switching device. The gas-liquid separator separates a refrigerant into a gas-phase refrigerant and a liquid-phase refrigerant. The switching device switches a refrigerant circuit for circulation of the refrigerant to one of respective refrigerant circuits in a first mode and a second mode. Specifically, the gas-liquid separator can be configured to separate the refrigerant flowing out of an exterior heat exchanger into the gas-phase refrigerant and liquid-phase refrigerant and to allow the gas-phase refrigerant to flow out of a gas-phase refrigerant outlet while allowing the liquid-phase refrigerant to flow out of a liquid-phase refrigerant outlet. The refrigerant circuit in the first mode causes the liquid-phase refrigerant to flow from the liquid-phase refrigerant outlet of the gas-liquid separator into a second decompression device and an evaporator and to be then drawn into a compressor. The refrigerant circuit in the second mode causes the gas-phase refrigerant to flow out of the gas-phase refrigerant outlet of the gas-liquid separator and to be then drawn into the compressor.

In a refrigeration cycle device, to lubricate a compressor, oil is generally mixed into a refrigerant. Most of the oil is mixed into the liquid-phase refrigerant. Therefore, in the refrigeration cycle device of Patent document 1, when the refrigerant circulates through the refrigerant circuit in the second mode, specifically, when the gas-phase refrigerant is returned to the compressor, part of the liquid-phase refrigerant retained in the gas-liquid separator is mixed into the gas-phase refrigerant, thereby causing the oil to return to the compressor. In this way, the shortage of oil in the compressor can be prevented.

RELATED ART DOCUMENT

Patent Document

Patent Document 1: Japanese Unexamined Patent Application Publication No. 2014-149123

SUMMARY OF THE INVENTION

Based on the studies conducted by the inventors of the present application, when the refrigerant circulates through the refrigerant circuit in the second mode, that is, when the refrigerant circulates in the refrigerant circuit that allows the refrigerant to flow out of the gas-phase refrigerant outlet of the gas-liquid separator, part of the liquid-phase refrigerant is mixed into the gas-phase refrigerant, enabling the oil to return to the compressor as mentioned above. However, to return a sufficient amount of oil to the compressor while preventing liquid compression, in which the compressor compresses the liquid-phase refrigerant, it is necessary to seal more oil into the refrigerant circuit through which the refrigerant flows.

On the other hand, when the refrigerant circulates through the refrigerant circuit in the first mode, that is, when the refrigerant circulates in the refrigerant circuit that allows the refrigerant to flow out of the liquid-phase refrigerant outlet of the gas-liquid separator, the liquid-phase refrigerant already containing a large amount of oil is fed to the evaporator on the downstream side as it is. Thus, the amount of the oil sealed in the first mode can be small, compared to that when the refrigerant circulates through the refrigerant circuit in the second mode. In other words, the amount of oil sealed when the refrigerant circulates through the refrigerant circuit in the second mode is extremely large if applied to the circulation of the refrigerant through the refrigerant circuit in the first mode, which leads to the possibility of troubles, such as a reduction in the efficiency of the refrigeration cycle. For this reason, when the refrigerant circulates through the refrigerant circuit to flow out of the liquid-phase refrigerant outlet of the gas-liquid separator, it is desirable to retain oil in a site other than the gas-liquid separator.

The present disclosure has been made in view of the foregoing points, and it is an object of the present disclosure to provide a refrigeration cycle device that can retain oil in a site other than a gas-liquid separator when a refrigerant circulates through a refrigerant circuit that causes the refrigerant to flow out of a liquid-phase refrigerant outlet of the gas-liquid separator.

A refrigeration cycle device according to one aspect of the present disclosure includes: a compressor that draws, compresses, and discharges a refrigerant; a heat dissipation device that dissipates heat held in the refrigerant discharged from the compressor, into a ventilation air which is to be blown into a space to be air-conditioned; a first decompression portion that decompresses the refrigerant flowing out of the heat dissipation device; an exterior heat exchanger that exchanges heat between the refrigerant flowing out of the first decompression portion and outside air; a gas-liquid separator that separates the refrigerant flowing out of the exterior heat exchanger into a gas-phase refrigerant and a liquid-phase refrigerant, the gas-liquid separator having a gas-phase refrigerant outlet from which the gas-phase refrigerant flows and a liquid-phase refrigerant outlet from which the liquid-phase refrigerant flows; a second decompression portion that decompresses the refrigerant flowing out of the liquid-phase refrigerant outlet of the gas-liquid separator; an evaporator that evaporates the refrigerant by exchanging heat between the refrigerant flowing out of the second decompression portion and the ventilation air; a switching device configured to be selectively switchable between a first refrigerant circuit and a second refrigerant circuit, and an oil separator provided in a refrigerant passage from the compressor to the exterior heat exchanger. The first refrigerant circuit is adapted to cause the refrigerant discharged from the compressor to flow into the gas-liquid separator and to flow out of the liquid-phase refrigerant outlet of the gas-liquid separator and then to cause the refrigerant from the liquid-phase refrigerant outlet to flow sequentially into the second decompression portion and the evaporator to be drawn into the compressor. On the other hand, the second refrigerant circuit is adapted to cause the refrigerant discharged from the compressor to flow into the gas-liquid separator and to flow out of the gas-phase refrigerant outlet of the gas-liquid separator, and then to cause the refrigerant from the gas-phase refrigerant outlet to be drawn into the compressor. Furthermore, the oil separator is adapted to separate oil from the refrigerant containing the oil and flowing into the oil separator from a refrigerant-flow upstream side of the oil separator, and then to cause the refrigerant after the separation to flow out toward a refrigerant-flow downstream side of the oil separator, while retaining the oil when the first refrigerant circuit is set.

The oil separator is adapted to separate oil from the refrigerant and to cause the refrigerant after the separation to flow out toward the refrigerant-flow downstream side of the oil separator, while retaining oil. Such an oil separator is disposed in the refrigerant passage that leads from the compressor to the exterior heat exchanger. Consequently, when the first refrigerant circuit is established to cause the refrigerant to flow out of the liquid-phase refrigerant outlet of the gas-liquid separator, the refrigerant passing through the oil separator is in a single gas phase or in an almost gas phase, and thereby the oil can be easily separated from the refrigerant. Accordingly, when the refrigerant circulates through the first refrigerant circuit, the oil can be retained at a site other than the gas-liquid separator.

When the second refrigerant circuit is configured, the refrigerant in the gas-liquid separator may be caused to flow out of the gas-phase refrigerant outlet but not from the liquid-phase refrigerant outlet, and concurrently the liquid-phase refrigerant after condensation in the heat dissipation device may be caused to flow into the oil separator, specifically, into the tank of the oil separator.

DESCRIPTION OF EMBODIMENTS

Figure 1:
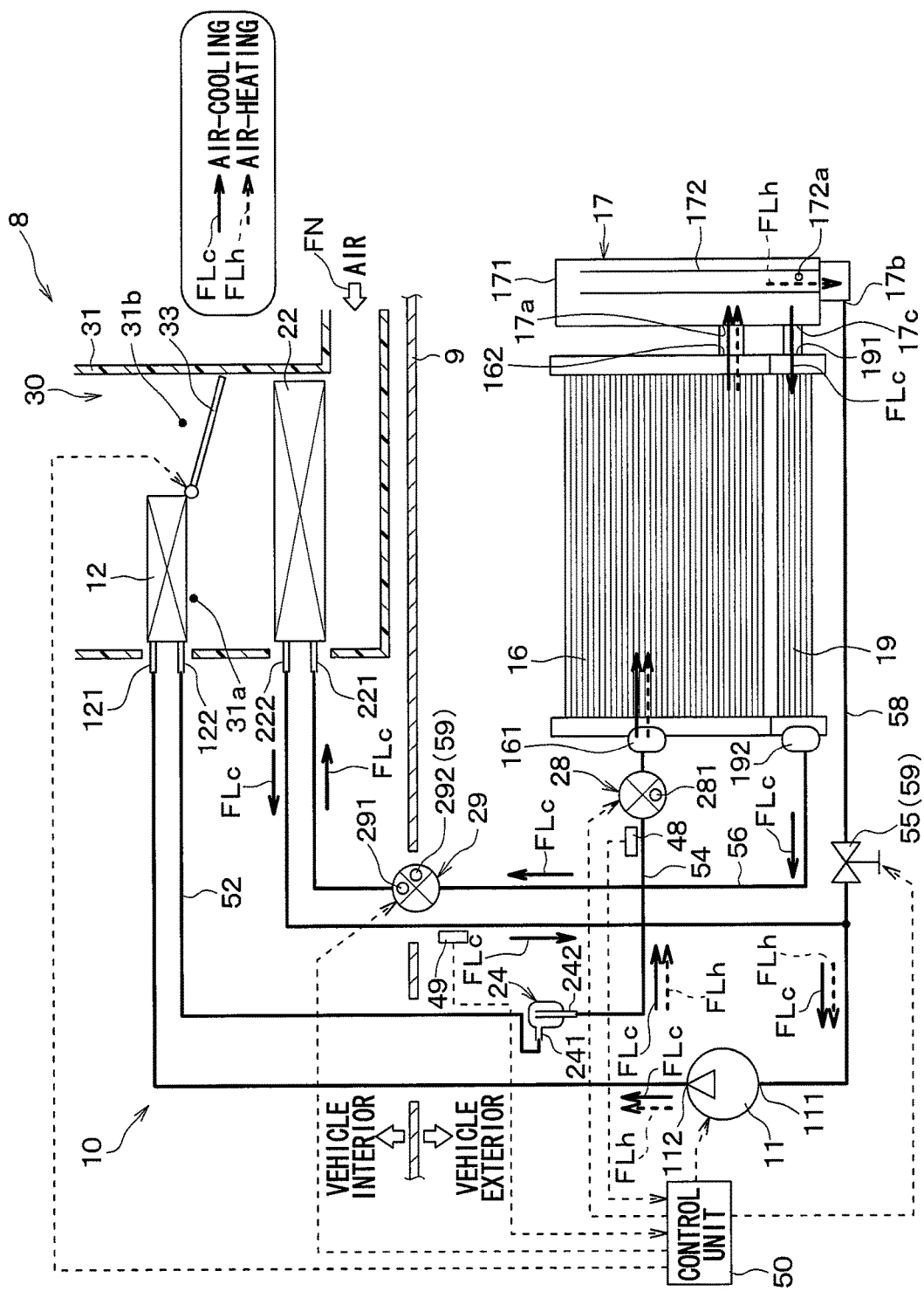
FIG. 1 is an entire configuration diagram of a vehicle air conditioner according to a first embodiment.

In the following, embodiments of the present disclosure will be described with reference to the accompanying drawings. Note that in the embodiments below, the same or equivalent parts are indicated by the same reference characters throughout the figures.

First Embodiment

FIG. 1 is an entire configuration diagram of a vehicle air conditioner 8 according to this embodiment. The vehicle air conditioner 8 is mounted on a hybrid vehicle that can obtain the traveling driving force from both an internal combustion engine (engine) and a traveling electric motor. As shown in FIG. 1, the vehicle air conditioner 8 includes a vapor-compression refrigeration cycle device 10. The refrigeration cycle device 10 serves to cool or heat the ventilation air to be blown into the vehicle interior as a space to be air-conditioned in the vehicle air conditioner 8.

The refrigeration cycle device 10 is configured to be switchable between a refrigerant circuit in an air-cooling mode (first mode) of performing air-cooling of the vehicle interior by cooling the ventilation air, and a refrigerant circuit in an air-heating mode (second mode) of performing air-heating of the vehicle interior by heating the ventilation air.

The refrigeration cycle device 10 forms a vapor-compression subcritical refrigeration cycle in which a high-pressure side refrigerant pressure does not exceed the critical pressure of the refrigerant, using a hydrofluorocarbon (HFC)-based refrigerant (e.g., R134a) as the refrigerant. Obviously, a hydrofluoroolefin (HFO)-based refrigerant (e.g., R1234yf) or the like may be adopted as the refrigerant. Further, oil for lubricating a compressor 11, i.e., refrigerant oil is mixed into the refrigerant, and part of the refrigerant oil circulates through the cycle together with the refrigerant.

The refrigeration cycle device 10 includes the compressor 11, a condenser 12, an exterior heat exchanger 16, a gas-liquid separator 17, a subcooler 19, an evaporator 22, an oil separator 24, a first expansion valve 28, a second expansion valve 29, temperature sensors 48 and 49, an electronic control unit 50, pipes 52 and 54, and an on-off valve 55.

The compressor 11 has a suction port 111 and a discharge port 112 and is disposed in an engine room. The engine room is a part of the vehicle exterior and is separated from the vehicle interior by an engine-room partition wall 9 that is included in the vehicle with the vehicle air conditioner 8 mounted thereon.

The compressor 11 draws and compresses the refrigerant from the suction port 111 in the refrigeration cycle device 10 and then discharges the compressed and superheated refrigerant from the discharge port 112. The compressor 11 is configured as an electric compressor that includes a fixed displacement compression mechanism with a discharge capacity fixed, driven by an electric motor. Specifically, the compression mechanism suitable for use can include various types of compression mechanisms, such as a scroll compression mechanism and a vane compression mechanism.

The electric motor of the compressor 11 has its operation (the number of revolutions) controlled by a control signal output from the electronic control unit 50. The electric motor may employ either an AC motor or a DC motor. The refrigerant discharge capacity of the compressor 11 is changed by controlling the number of revolutions of the electric motor.

The discharge port 112 of the compressor 11 is connected to a refrigerant inlet 121 of the condenser 12. The condenser 12 is a heat dissipation device that dissipates heat held in the refrigerant at high temperature and high pressure discharged from the compressor 11, into the ventilation air to be blown into the vehicle interior. Specifically, the condenser 12 is disposed in a casing 31 of an interior air-conditioning unit 30. The condenser 12 heats the ventilation air while condensing the refrigerant by exchanging heat between the refrigerant in the condenser 12 and the ventilation air passing through the condenser 12.

The condenser 12 causes the refrigerant to flow out of a refrigerant outlet 122 of the condenser 12. The refrigerant outlet 122 of the condenser 12 is connected to a refrigerant inlet portion 241 of the oil separator 24 via a first high-pressure pipe 52. The details of the oil separator 24 are shown in FIG. 2.

Figure 2:
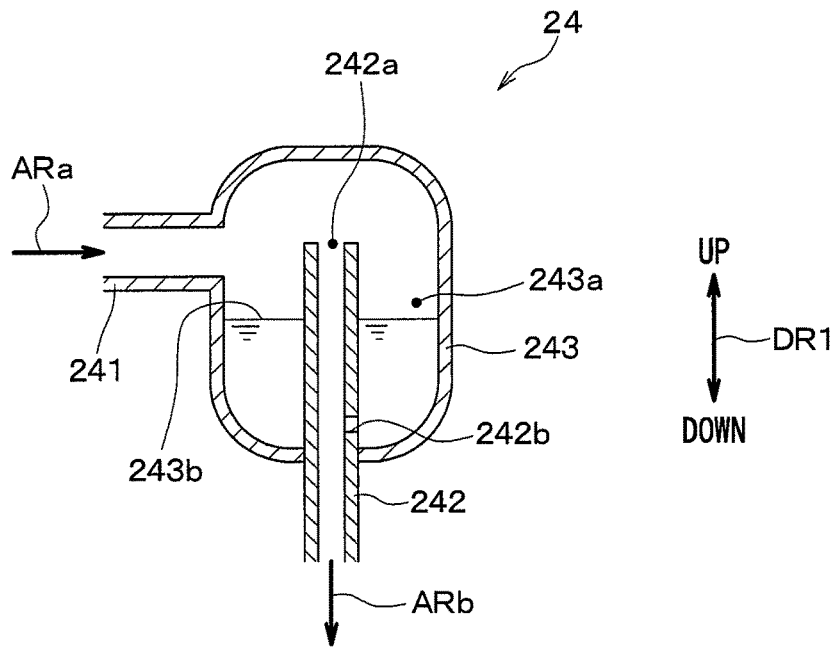
FIG. 2 is a cross-sectional view showing the inside of an oil separator provided in the vehicle air conditioner shown in FIG. 1.

FIG. 2 is a cross-sectional view showing the inside of the oil separator 24. The up-down direction of the oil separator 24 is indicated by the arrow DR1. The oil separator 24 is disposed in a refrigerant route that leads from the discharge port 112 of the compressor 11 to a refrigerant inlet 161 of the exterior heat exchanger 16. In detail, the oil separator 24 is disposed between the condenser 12 and the first expansion valve 28 in the refrigerant route.

The oil separator 24 separates, from the refrigerant, oil mixed in the refrigerant flowing thereinto from the refrigerant-flow upstream side of the oil separator 24. Furthermore, the oil separator 24 causes the separated refrigerant to flow toward the refrigerant-flow downstream side of the oil separator and retains oil therein. As shown in FIG. 2, the oil separator 24 includes the refrigerant inlet portion 241, a refrigerant outlet portion 242, and a tank 243.

The tank 243 of the oil separator 24 is a sealed container that is not open except for the refrigerant inlet portion 241 and the refrigerant outlet portion 242. The tank 243 has an oil reservoir space 243a formed therein to retain oil separated from the refrigerant.

The refrigerant inlet portion 241 of the oil separator 24 has a pipe shape and allows the refrigerant to flow into the oil reservoir space 243a from the first high-pressure pipe 52 (see FIG. 1) provided on the refrigerant-flow upstream side of the oil separator 24 as indicated by the arrow ARa.

The refrigerant outlet portion 242 of the oil separator 24 allows the refrigerant in the oil reservoir space 243a to flow out to a second high-pressure pipe 54 (see FIG. 1) provided on the refrigerant-flow downstream side of the oil separator 24 as indicated by the arrow ARb. That is, the refrigerant outlet portion 242 is connected to the second high-pressure pipe 54. In detail, the refrigerant outlet portion 242 is inserted into the oil reservoir space 243a, and has an in-reservoir-space inlet 242a that is open inside the oil reservoir space 243a. The refrigerant outlet portion 242 flows out the refrigerant via the in-reservoir space inlet 242a toward the refrigerant-flow downstream side of the oil separator 24, i.e., toward the second high-pressure pipe 54. The pipe-shaped refrigerant outlet portion 242 is provided with an oil return hole 242b, which is a fine through hole. The oil return hole 242b communicates the inside of the refrigerant outlet portion 242 with the bottom part of the oil reservoir space 243a.

The oil separator 24 with the structure separates oil from the refrigerant by using gravity. When the refrigerant flowing into the oil separator 24 is a liquid-phase refrigerant, the oil separator 24 cannot separate oil from the liquid-phase refrigerant. When the refrigerant flowing into the refrigerant inlet portion 241 is all in a gas-phase state or in a gas-liquid two phase state with its majority being in a gas phase, the oil separator 24 separates oil from the gas-phase refrigerant. In this case, a small amount of the oil retained in the oil reservoir space 243a is mixed through the oil return hole 242b into the gas-phase refrigerant flowing through the refrigerant outlet portion 242 toward the second high-pressure pipe 54.

Note that the oil separator 24 does not completely separate oil from the refrigerant. For instance, when separating oil from the gas-phase refrigerant, the oil separator 24 mainly causes the gas-phase refrigerant rather than oil to flow out toward the refrigerant-flow downstream side of the oil separator. In other words, the oil rate, namely, the rate of oil mixed in the refrigerant flowing out of the refrigerant outlet portion 242 is set smaller than the oil rate in the refrigerant flowing into the refrigerant inlet portion 241.

Returning to FIG. 1, the second high-pressure pipe 54 is interposed between the refrigerant outlet portion 242 of the oil separator 24 and the first expansion valve 28 to connect the refrigerant outlet portion 242 with the refrigerant inlet side of the first expansion valve 28.

The first expansion valve 28 is an electric variable throttle mechanism that includes a valve body configured to have its variable throttle opening and an electric actuator 281 formed by a stepping motor to vary the throttle opening by displacing the valve body. That is, the first expansion valve 28 serves as a first decompression portion that decompresses the refrigerant having flowed out of the condenser 12 in accordance with the operation of the electric actuator 281.

In more detail, the operating state of the first expansion valve 28 is switched by the electric actuator 281 between an open state and a decompression state. In the open state, the refrigerant flowing from the second high-pressure pipe 54 into the first expansion valve 28 is allowed to flow to the exterior heat exchanger 16 almost without being throttled. In the decompression state, the refrigerant flowing into the first expansion valve 28 is decompressed more than in the open state, and thereby the decompressed refrigerant is caused by the first expansion valve to flow out to the exterior heat exchanger 16. In other words, the electric actuator 281 serves as an operation switching portion that switches the first expansion valve 28 between the open state and the decompression state by varying the throttle opening of the first expansion valve 28.

Specifically, the first expansion valve 28 fully opens its throttle opening by means of the electric actuator 281 and thereby is brought into a state of serving as just a refrigerant passage almost without exhibiting a refrigerant decompression effect. The state is the open state described above. That is, the first expansion valve 28 is a variable throttle mechanism with the fully-open function. Note that the electric actuator 281 has its operation controlled by a control signal output from the electronic control unit 50.

The first expansion valve 28 in the decompression state adjusts the subcooling degree of the refrigerant at the refrigerant outlet 122 of the condenser 12 in accordance with the control signal output from the electronic control unit 50 based on the refrigerant temperature at the outlet side of the condenser 12 detected by a condenser-downstream side temperature sensor 48.

The exterior heat exchanger 16 is installed at the front side of the engine room and has the refrigerant inlet 161 and a refrigerant outlet 162. The refrigerant inlet 161 of the exterior heat exchanger 16 lets in the refrigerant having flowed out of the first expansion valve 28. The exterior heat exchanger 16 exchanges heat between the refrigerant having flowed out of the first expansion valve 28 and circulating through the exterior heat exchanger 16 and the vehicle exterior air blown by a blower fan (not shown). The exterior heat exchanger 16 functions as either an evaporator or a condenser in accordance with the temperature of the refrigerant flowing into the exterior heat exchanger 16. The exterior heat exchanger 16 has its function switched by the first expansion valve 28. The exterior heat exchanger 16 causes the refrigerant to flow from the refrigerant outlet 162 into a refrigerant inlet 17a of the gas-liquid separator 17 after the heat exchange. The above-mentioned blower fan is an electric blower that has the number of revolutions (blowing capacity) controlled by a control voltage output from the electronic control unit 50.

The gas-liquid separator 17 has the refrigerant inlet 17a, a gas-phase refrigerant outlet 17b, and a liquid-phase refrigerant outlet 17c. The gas-liquid separator 17 separates the refrigerant flowing from the refrigerant inlet 17a into the gas-liquid separator 17, into a gas-phase refrigerant and a liquid-phase refrigerant. The gas-liquid separator 17 causes the separated gas-phase refrigerant to flow out of the gas-phase refrigerant outlet 17b, while causing the liquid-phase refrigerant to flow out of the liquid-phase refrigerant outlet 17c. The gas-phase refrigerant outlet 17b of the gas-liquid separator 17 is connected to the suction port 111 of the compressor 11 via the on-off valve 55.

The internal structure of the gas-liquid separator 17 is substantially the same as that described in Patent Document 1. The gas-liquid separator 17 has a tank main body 171 for retaining therein the separated liquid-phase refrigerant, and a pipe-shaped member 172 with an oil return hole 172a formed therein. One end of the pipe-shaped member 172 is disposed to be constantly opened at a higher level than the liquid surface of the liquid-phase refrigerant within the tank main body 171. The other end of the pipe-shaped member 172 communicates with the gas-phase refrigerant outlet 17b. The gas-phase refrigerant flowing into the pipe-shaped member 172 from its one end flows toward the gas-phase refrigerant outlet 17b through the pipe-shaped member 172. At the midpoint, a small amount of the liquid-phase refrigerant containing oil is mixed into the gas-phase refrigerant via the oil return hole 172a. It is confirmed that the gas-liquid separator 17 is not a device that completely separates the gas-phase refrigerant from the liquid-phase refrigerant, and that the gas-phase refrigerant outlet 17b mainly flows out the gas-phase refrigerant, while the liquid-phase refrigerant outlet 17c mainly flows out the liquid-phase refrigerant.

The subcooler 19 has a refrigerant inlet 191 and a refrigerant outlet 192. The refrigerant inlet 191 is connected to the liquid-phase refrigerant outlet 17c of the gas-liquid separator 17. The subcooler 19 is disposed between the liquid-phase refrigerant outlet 17c of the gas-liquid separator 17 and the second expansion valve 29. The subcooler 19 further cools the liquid-phase refrigerant by exchanging heat between the outside air and the refrigerant flowing out of the liquid-phase refrigerant outlet 17c of the gas-liquid separator 17, thereby enhancing the subcooling degree of the refrigerant. Then, the subcooler 19 causes the refrigerant after the heat exchange to flow out of the refrigerant outlet 192 into the second expansion valve 29. In short, the subcooler 19 is a heat exchanger that subcools the refrigerant having flowed out of the liquid-phase refrigerant outlet 17c of the gas-liquid separator 17. As shown in FIG. 1, the exterior heat exchanger 16, the gas-liquid separator 17, and the subcooler 19 are integrally configured by being bolted together or the like.

The second expansion valve 29 is an electric variable throttle mechanism that includes a valve body configured to have its variable throttle opening and an electric actuator formed by a stepping motor to vary the throttle opening by displacing the valve body. Note that the electric actuator has its operation controlled by a control signal output from the electronic control unit 50.

In more detail, the second expansion valve 29 is a variable throttle mechanism with a fully closing function that interrupts the refrigerant flow by setting the throttle opening at zero. Thus, the second expansion valve 29 functionally includes a decompression portion 291 that decompresses the refrigerant by throttling the refrigerant flow, and an opening/closing portion 292 that opens and closes the decompression portion 291 within the second expansion valve 29. That is, the decompression portion 291 of the second expansion valve 29 is included in a first route 56 for the refrigerant that leads from the liquid-phase refrigerant outlet 17c of the gas-liquid separator 17 to the suction port 111 of the compressor 11. The opening/closing portion 292 serves as a first route opening/closing portion that opens and closes the first route 56.

The decompression portion 291 of the second expansion valve 29 is a second decompression portion that is different from the first expansion valve 28 as the first decompression portion. The decompression portion 291 decompresses the refrigerant having flowed out of the liquid-phase refrigerant outlet 17c of the gas-liquid separator 17 in accordance with its throttle opening. The decompression portion 291 of the second expansion valve 29 adjusts the superheat degree of the refrigerant at the refrigerant outlet 222 of the evaporator 22 in accordance with the control signal output from the electronic control unit 50 based on the refrigerant temperature at the outlet side of the evaporator 22 detected by a evaporator-outlet temperature sensor 49. Note that the decompression portion 291 and the opening/closing portion 292 of the second expansion valve 29 shown in FIG. 1 are integrally formed and cannot be separated mechanically from each other. Alternatively, the decompression portion 291 and the opening/closing portion 292 may be configured to be mechanically separable from each other.

The evaporator 22 has a refrigerant inlet 221, into which the refrigerant flows, and a refrigerant outlet 222, out of which the refrigerant flows after the heat exchange within the evaporator 22. The evaporator 22 is disposed on the upstream side of the ventilation air flow with respect to the condenser 12 within the casing 31 of the interior air-conditioning unit 30. The evaporator 22 is a cooling heat exchanger that cools the ventilation air in an air-cooling mode, specifically, evaporates the refrigerant by exchanging heat between the refrigerant having flowed out of the decompression portion 291 of the second expansion valve 29 and the ventilation air within the casing 31. Note that the interior air-conditioning unit 30 includes a blower on the upstream side of the air flow with respect to the evaporator 22. The ventilation air is fed by the blower to the evaporator 22 as indicated by the arrow FN.

The on-off valve 55 is an electromagnetic on-off valve that operates in response to a control signal from the electronic control unit 50. The on-off valve 55 is disposed in a second route 58 that leads from the gas-phase refrigerant outlet 17b of the gas-liquid separator 17 to the suction port 111 of the compressor 11. The on-off valve 55 serves as a second route opening/closing portion that opens/closes the second route 58. Specifically, the on-off valve 55 opens the gas-phase refrigerant outlet 17b of the gas-liquid separator 17 when using the exterior heat exchanger 16 as the evaporator, and interrupts the gas-phase refrigerant outlet 17b when using the exterior heat exchanger 16 as a condenser.

The electronic control unit 50 selectively opens either the first route 56 or the second route 58 by controlling the on-off valve 55 and the opening/closing portion 292 of the second expansion valve 29. Therefore, the on-off valve 55 and the opening/closing portion 292 of the second expansion valve 29 configure a switching device 59 as a whole that selectively establishes either a first refrigerant circuit or a second refrigerant circuit. The first refrigerant circuit is a refrigerant circuit in an air-cooling mode that partially includes the first route 56, while the second refrigerant circuit is a refrigerant circuit in an air-heating mode that partially includes the second route 58.

In the first refrigerant circuit, the refrigerant circulates as indicated by the solid arrows FLc in FIG. 1. That is, the first refrigerant circuit is a refrigerant circuit that causes the refrigerant discharged from the compressor 11 to flow out of the liquid-phase refrigerant outlet 17c of the gas-liquid separator 17 while flowing into the gas-liquid separator 17, and then causes the refrigerant having flowed out of the liquid-phase refrigerant outlet 17c to flow through the sub-cooler 19, the decompression portion 291 of the second expansion valve 29, and the evaporator 22 in this order to be eventually drawn into the compressor 11.

In the second refrigerant circuit, the refrigerant circulates as indicated by the dashed arrows FLh in FIG. 1. That is, the second refrigerant circuit is a refrigerant circuit that causes the refrigerant discharged from the compressor 11 to flow out of the gas-phase refrigerant outlet 17b of the gas-liquid separator 17 while flowing into the gas-liquid separator 17, and then causes the refrigerant having flowed out of the gas-phase refrigerant outlet 17b to be drawn into the compressor 11.

That is, the first refrigerant circuit is established by opening the first route 56 through the opening/closing portion 292 of the second expansion valve 29 while closing the second route 58 through the on-off valve 55. Meanwhile, the second refrigerant circuit is established by closing the first route 56 through the opening/closing portion 292 of the second expansion valve 29 while opening the second route 58 through the on-off valve 55.

The condenser-downstream side temperature sensor 48 is a temperature sensor installed in the second high-pressure pipe 54. The condenser-downstream side temperature sensor 48 detects the temperature of the refrigerant having flowed out of the condenser 12 and sequentially outputs a detection signal indicative of the temperature of the refrigerant to the electronic control unit 50. In detail, the condenser-downstream side temperature sensor 48 is a temperature sensor for detecting the subcooling degree of the refrigerant having flowed out of the condenser 12 in the air-heating mode.

The evaporator-outlet temperature sensor 49 is a temperature sensor disposed in a refrigerant route from the refrigerant outlet 222 of the evaporator 22 to the suction port 111 of the compressor 11. The evaporator-outlet temperature sensor 49 may detect the temperature of the refrigerant at the refrigerant outlet 222 of the evaporator 22, or alternatively may detect the temperature of the refrigerant at the suction port 111 of the compressor 11. The evaporator-outlet temperature sensor 49 sequentially outputs a detection signal indicative of the temperature of the refrigerant to the electronic control unit 50. In detail, the evaporator-outlet temperature sensor 49 is a temperature sensor for detecting the superheat degree of the refrigerant having flowed out of the refrigerant outlet 222 of the evaporator 22 in the air-cooling mode.

The interior air-conditioning unit 30 includes a ventilation-air-passage switching door 33, in addition to the above-mentioned casing 31. Within the casing 31, a hot-air passage 31a and a cold-air passage 31b are formed in parallel with each other. The condenser 12 is disposed in the hot-air passage 31a. That is, the hot-air passage 31a is an air passage that causes the ventilation air having passed through the evaporator 22 to flow toward the condenser 12. The cold-air passage 31b is an air passage that causes the ventilation air to flow therethrough while bypassing the condenser 12.

The ventilation-air-passage switching door 33 is operated based on a control signal output from the electronic control unit 50. The ventilation-air-passage switching door 33 is positioned to either a first door position for opening the cold-air passage 31b while closing the hot-air passage 31a or a second door position for closing the cold-air passage 31b while opening the hot-air passage 31a. Specifically, the ventilation-air-passage switching door 33 is positioned at the first door position in the air-cooling mode and at the second door position in the air-heating mode. For instance, the ventilation-air-passage switching door 33 shown in FIG. 1 is positioned at the second door position.

The casing 31 is provided with a plurality of opening holes on the air-flow downstream side of the hot-air passage 31a and the cold-air passage 31b. From the openings, the ventilation air (conditioned air) passing through the hot-air passage 31a or the cold-air passage 31b is blown toward the vehicle interior as a space to be air-conditioned. Specifically, the openings include a face opening for blowing the conditioned air toward the upper body of an occupant in the vehicle interior, a foot opening for blowing the conditioned air toward the feet of the occupant, and a defroster opening for blowing the conditioned air toward the inner surface of a windshield of the vehicle (all openings not shown). In each opening, an opening/closing door for opening and closing the corresponding opening is provided.

The electronic control unit 50 shown in FIG. 1 is configured of a microcomputer, including a CPU, an ROM, and an RAM (not shown). Signals from sensors and the like connected to the electronic control unit 50 are subjected to A/D conversion by an input circuit (not shown) and then input to the microcomputer. The electronic control unit 50 serves as an air-conditioning controller for executing various air-conditioning control processing. As one of the air-conditioning control processing, the refrigeration cycle device 10 executes refrigerant-circuit switching control for switching the refrigerant circuit.

Figure 3:
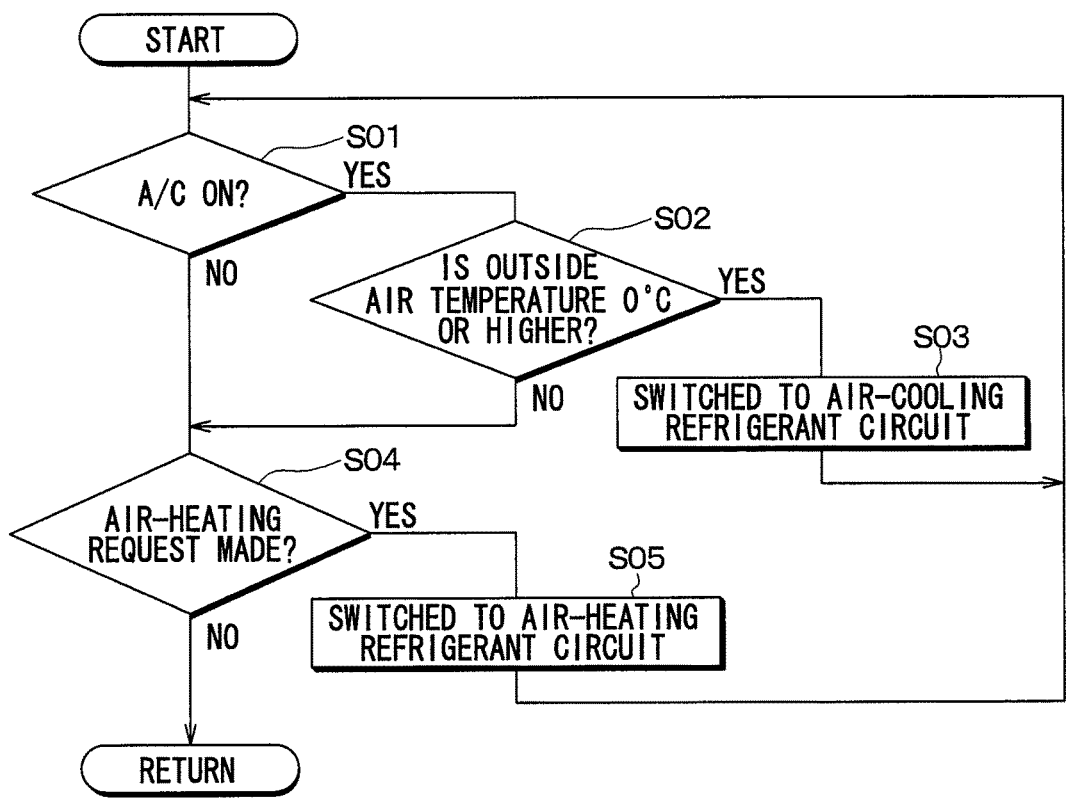
FIG. 3 is a flowchart showing control processing for an electronic control unit shown in FIG. 1 to execute refrigerant-circuit switching control.

FIG. 3 is a flowchart showing the control processing for executing the refrigerant-circuit switching control. For example, when an ignition switch of the vehicle is turned on, the electronic control unit 50 starts the control processing shown in FIG. 3 and repeatedly executes the control processing periodically as illustrated in FIG. 3.

Referring to FIG. 3, in step S01, the electronic control unit 50 determines whether or not an A/C button (not shown) as an air-conditioner switch is turned on by an occupant's operation. The air-conditioner switch is an operation button to be turned on or off, and is installed at the position that permits an occupant to operate it easily in the vehicle interior. The occupant turns on the air-conditioner switch when executing an air-conditioning operation for cooling or dehumidifying the conditioned air by the evaporator 22.

If the air-conditioner switch is determined to be turned on in step S01, the operation proceeds to step S02. On the other hand, if the air-conditioner switch is determined not to be turned on, if the air-conditioner switch is determined to be turned off, the operation proceeds to step S04.

In step S02, the electronic control unit receives a temperature detection signal indicative of the outside air temperature from an outside-air temperature sensor (not shown) and determines whether or not the outside air temperature is equal to or higher than 0° C. If the outside air temperature is determined to be equal to or higher than 0° C. in step S02, the operation proceeds to step S03. On the other hand, if the outside air temperature is determined to be lower than 0° C., the operation proceeds to step S04.

In step S03, the opening/closing portion 292 of the second expansion valve 29 and the on-off valve 55 are operated to establish the first refrigerant circuit, which is an air-cooling refrigerant circuit. That is, the refrigerant circuit for circulation of the refrigerant in the refrigeration cycle device 10 is switched to the first refrigerant circuit. When the first refrigerant circuit has already been established, the first refrigerant circuit is continued. With the establishment of the first refrigerant circuit by the opening/closing portion 292 of the second expansion valve 29 and the on-off valve 55, the first expansion valve 28 is switched to the open state. In this way, the refrigeration cycle device 10 is brought into the air-cooling mode.

While the first refrigerant circuit is established, the electronic control unit 50 positions the ventilation-air-passage switching door 33 (see FIG. 1) at the first door position for closing the hot-air passage 31a. With the arrangement, the ventilation air is substantially prevented from flowing to the hot-air passage 31a of the interior air-conditioning unit 30, thereby stopping the heat exchange between the refrigerant and the ventilation air in the condenser 12.

Thus, the high-temperature and high-pressure gas-phase refrigerant discharged from the discharge port 112 of the compressor 11 passes through the oil separator 24 and the first expansion valve 28 without dissipating its heat in the condenser 12, and then flows into the exterior heat exchanger 16. At this time, since the first expansion valve 28 is in an open state, the refrigerant is hardly decompressed and flows into the exterior heat exchanger 16 in the superheated state. When focusing on the outflow-refrigerant pressure of the refrigerant flowing out of the first expansion valve 28, the first expansion valve 28 in the open state sets the outflow-refrigerant pressure at a value that makes the temperature of the refrigerant higher than a temperature of the outside air in the exterior heat exchanger 16. Thus, the exterior heat exchanger 16 serves as a condenser that condenses the refrigerant by exchanging heat between the outside air and the refrigerant. The exterior heat exchanger 16 causes the refrigerant after the heat exchange to flow therefrom to the gas-liquid separator 17.

At this time, the first route 56 (see FIG. 1) is opened by the second expansion valve 29 while the second route 58 is closed by the on-off valve 55, so that the refrigerant in the gas-liquid separator 17 flows out of the liquid-phase refrigerant outlet 17c without flowing out of the gas-phase refrigerant outlet 17b. That is, the gas-liquid separator 17 serves as a receiver that mainly flows the liquid-phase refrigerant therefrom.

The refrigerant flowing out of the liquid-phase refrigerant outlet 17c passes through the subcooler 19 and is decompressed and expanded by the decompression portion 291 of the second expansion valve 29. Then, the refrigerant is evaporated and gasified in the evaporator 22, and then returns from the evaporator 22 to the suction port 111 of the compressor 11. In short, the refrigerant circulates as indicated by the solid arrows FLc in FIG. 1, so that the interior air-conditioning unit 30 can perform an air-cooling operation for cooling the ventilation air by the evaporator 22.

As mentioned above, the high-temperature and high-pressure gas-phase refrigerant discharged from the compressor 11 flows into the oil separator 24 without dissipating its heat in the condenser 12, so that the gas-phase refrigerant flows into the tank 243 (see FIG. 2) of the oil separator 24.

Thus, when the first refrigerant circuit is established in step S03 shown in FIG. 3, the oil separator 24 separates oil from the gas-phase refrigerant having the oil mixed therein and flowing into the oil separator 24 from its refrigerant-flow upstream side of the oil separator. Then, as shown in FIG. 2, the oil separator 24 causes the separated gas-phase refrigerant to flow out of the refrigerant outlet portion 242 into the second high-pressure pipe 54, while retaining the oil in the oil reservoir space 243a. At this time, the oil retained in the oil reservoir space 243a is mixed little by little from the oil return hole 242b into the gas-phase refrigerant flowing through the refrigerant outlet portion 242, thereby preventing the oil from being retained excessively in the oil reservoir space 243a. Thus, the appropriate amount of circulating oil is maintained in the first refrigerant circuit. Note that when the first refrigerant circuit is established, the in-reservoir-space inlet 242a of the refrigerant outlet portion 242 included in the oil separator 24 is disposed to be opened at a higher level than a liquid surface 243b of the oil stored in the oil reservoir space 243a. After step S03 in FIG. 3, the operation returns to step S01.

In step S04, based on an air-conditioning preset temperature, it is determined whether or not an air-heating request, i.e., a request for the air-heating operation is made by an occupant. The air-conditioning preset temperature is arbitrarily set by the occupant, for example, as a target value of the temperature of the vehicle interior. The air-heating request is determined to be made when the air-conditioning preset temperature exceeds a temperature of the vehicle interior detected by a vehicle-interior temperature sensor.

If in step S04, the air-heating request is determined to be made, the operation proceeds to step S05. On the other hand, if it is determined that there is no request for the air-heating, the control processing shown in FIG. 3 will be ended, and then the operation will re-start from step S01.

In step S05, the opening/closing portion 292 of the second expansion valve 29 and the on-off valve 55 are operated to establish the second refrigerant circuit, which is the air-heating refrigerant circuit. That is, the refrigerant circuit for circulation of the refrigerant in the refrigeration cycle device 10 is switched to the second refrigerant circuit. With the establishment of the second refrigerant circuit by the opening/closing portion 292 of the second expansion valve 29 and the on-off valve 55, the first expansion valve 28 is switched to the decompression state. In this way, the refrigeration cycle device 10 is brought into the air-heating mode. When the second refrigerant circuit is already established, the second refrigerant circuit is continued.

While the second refrigerant circuit is established, the electronic control unit 50 positions the ventilation-air-passage switching door 33 (see FIG. 1) at the second door position for opening the hot-air passage 31a. With the arrangement, the ventilation air flows to the hot-air passage 31a of the interior-air conditioning unit 30, and the condenser 12 exchanges heat between the refrigerant and the ventilation air. Thus, the refrigerant flowing through the condenser 12 is condensed and subcooled and then flows out of the condenser 12. As can be seen from the comparison of the description between the step S03 and the step S05, the ventilation-air-passage switching door 33 serves as a heat-dissipation-amount switching device that suppresses the heat dissipation from the refrigerant into the ventilation air in establishment of the first refrigerant circuit, compared to in establishment of the second refrigerant circuit. Thus, the condenser 12 does not exchange heat between the refrigerant and the ventilation air in the air-cooling mode of the refrigeration cycle device 10, but serves as an air-heating mode condenser that condenses the refrigerant by heat exchange in the air-heating mode.

The refrigerant flowing out of the condenser 12 enters into the first expansion valve 28, while the first expansion valve 28 is in a decompression state. Thus, the refrigerant is decompressed and expanded by the first expansion valve 28 to be brought into a gas-liquid two-phase. The first expansion valve 28 causes the decompressed refrigerant to flow out toward the exterior heat exchanger 16. When focusing on the outflow-refrigerant pressure of the refrigerant flowing out of the first expansion valve 28, the first expansion valve 28 in the decompression state sets the outflow-refrigerant pressure at a value that makes the temperature of the refrigerant lower than a temperature of the outside air in the exterior heat exchanger 16. Thus, the exterior heat exchanger 16 serves as an evaporator that evaporates the refrigerant by exchanging heat between the outside air and the refrigerant flowing thereinto. The exterior heat exchanger 16 causes the refrigerant after the heat exchange to flow out toward the gas-liquid separator 17. That is, the exterior heat exchanger 16 selectively functions as either the evaporator or condenser in accordance with whether the first expansion valve 28 is switched to the decompression state or the open state.

When the air-heating second refrigerant circuit is established, the first route 56 (see FIG. 1) is closed and the second route 58 is open, so that the refrigerant in the gas-liquid separator 17 flows out of the gas-phase refrigerant outlet 17b without flowing out of the liquid-phase refrigerant outlet 17c. That is, the gas-liquid separator 17 serves as an accumulator that mainly flows the gas-phase refrigerant therefrom.

The refrigerant flowing out of the gas-phase refrigerant outlet 17b is returned to the suction port 111 of the compressor 11 via the on-off valve 55. In short, the refrigerant circulates as indicated by the dash arrows FLh in FIG. 1, so that the interior air-conditioning unit 30 can perform an air-heating operation for heating the ventilation air in the condenser 12. At this time, since the refrigerant does not circulate through the evaporator 22, the ventilation air passes just through the evaporator 22 without exchanging heat at the evaporator 22.

When the second refrigerant circuit is established, the liquid-phase refrigerant condensed by the condenser 12 flows into the oil separator 24 as mentioned above. Unlike when the first refrigerant circuit is established in the above step S03 (see FIG. 3), the liquid-phase refrigerant flows into the tank 243 of the oil separator 24 (see FIG. 2).

Thus, when the second refrigerant circuit is established in step S05 shown in FIG. 3, the inside of the tank 243 in the oil separator 24 shown in FIG. 2 is filled with the liquid-phase refrigerant. Therefore, the oil separator 24 allows the oil to flow out toward the second high-pressure pipe 54 together with the liquid-phase refrigerant without separating the liquid-phase refrigerant from the oil, in other words, without retaining oil separated from the refrigerant. After step S05 shown in FIG. 3, the operation returns to the step S01.

Although the illustration is omitted, the electronic control unit 50 executes a plurality of air-conditioning control processing during and in parallel with the control processing shown in FIG. 3. The air-conditioning control processing includes blower control, compressor driving control, ventilation-air-passage switching door control, and air-outlet mode control. The blower control involves increasing and decreasing the volume of blown air by the blower in the interior air-conditioning unit 30. The compressor driving control involves increasing and decreasing the number of revolutions of the compressor 11. The ventilation-air-passage switching door control involves rotating the ventilation-air-passage switching door 33. The air-outlet mode control involves opening and closing an opening/closing door provided in each opening of the casing 31.

The above-mentioned processing in each step shown in FIG. 3 constitutes means for achieving the corresponding function.

As mentioned above, in this embodiment, the oil separator 24 is provided in the refrigerant route that leads form the compressor 11 to the exterior heat exchanger 16. When the first refrigerant circuit is established in the refrigeration cycle device 10, the refrigerant passing through the oil separator 24 is in a single gas phase or in an almost gas phase, so that oil can be easily separated from the refrigerant. Although the gas-liquid separator 17 retains oil together with the liquid-phase refrigerant, it is also possible to retain oil in a position other than the gas-liquid separator 17 when causing the refrigerant to circulate through the first refrigerant circuit.

In this embodiment, the oil separator 24 includes the tank 243 that forms the oil reservoir space 243a for retaining oil separated from the refrigerant; the refrigerant inlet portion 241 that allows the refrigerant to flow from the refrigerant-flow upstream side of the oil separator 24 into the oil reservoir space 243a; and the refrigerant outlet portion 242 that allows the refrigerant in the oil reservoir space 243a to flow out toward the refrigerant-flow downstream side of the oil separator 24. Therefore, the oil separator 24 can be easily disposed in the midpoint of the refrigerant route through which the refrigerant flows.

Furthermore, in this embodiment, the refrigerant outlet portion 242 of the oil separator 24 has the in-reservoir-space inlet 242a, and allows the refrigerant entering the oil separator from the in-reservoir-space inlet 242a to flow out toward the refrigerant-flow downstream side of the oil separator 24. When the first refrigerant circuit is established, the in-reservoir-space inlet 242a of the refrigerant outlet portion 242 is disposed to be opened within the oil reservoir space 243a at the higher level than the liquid surface 243b of the oil retained in the oil reservoir space 243a. Since the refrigerant flowing into the oil separator 24 is in the almost gas phase in the establishment of the first refrigerant circuit, making it possible to easily separate oil from the refrigerant using the gravity.

In this embodiment, the oil separator 24 is disposed between the condenser 12 and the first expansion valve 28 in the refrigerant route that leads from the compressor 11 to the exterior heat exchanger 16. The state of the refrigerant located between the condenser 12 and the first expansion valve 28 is in a gas phase or substantially gas phase in the air-cooling mode where the refrigerant circulates through the first refrigerant circuit, while in a liquid phase or substantially liquid phase in the air-heating mode where the refrigerant circulates through the second refrigerant circuit. Therefore, the oil is retained in the oil separator 24 in the air-cooling mode, so that the amount of circulating oil through the first refrigerant circuit is preventing from becoming excessive, and the oil separator 24 can function to maintain the appropriate amount of circulating oil. Furthermore, in the air-heating mode, the excess refrigerant can be retained in the tank 243 of the oil separator 24 in the second refrigerant circuit. Thus, the gas-liquid separator 17 is adapted to have the function of retaining the excess refrigerant. In such a gas-liquid separator 17, a difference in the amount of retained excess refrigerant between the air-heating mode and the air-cooling mode can be reduced, further achieving the reduction in the size of the gas-liquid separator 17.

In this embodiment, the exterior heat exchanger 16 and the subcooler 19 are integrally configured. Thus, the exterior heat exchanger 16 and the subcooler 19 can be easily installed.

Furthermore, in this embodiment, the exterior heat exchanger 16 and the gas-liquid separator 17 are integrally configured. Thus, the exterior heat exchanger 16 and the gas-liquid separator 17 can be easily installed, thereby making it possible to eliminate or shorten a pipe between the exterior heat exchanger 16 and the gas-liquid separator 17.

Second Embodiment

A second embodiment of the present disclosure will be described. In this embodiment, different points from the first embodiment described above will be mainly described below. The description of the same or equivalent parts as the above-mentioned embodiment will be omitted or simplified. The same goes for the third or following embodiments to be described later.

Figure 4:
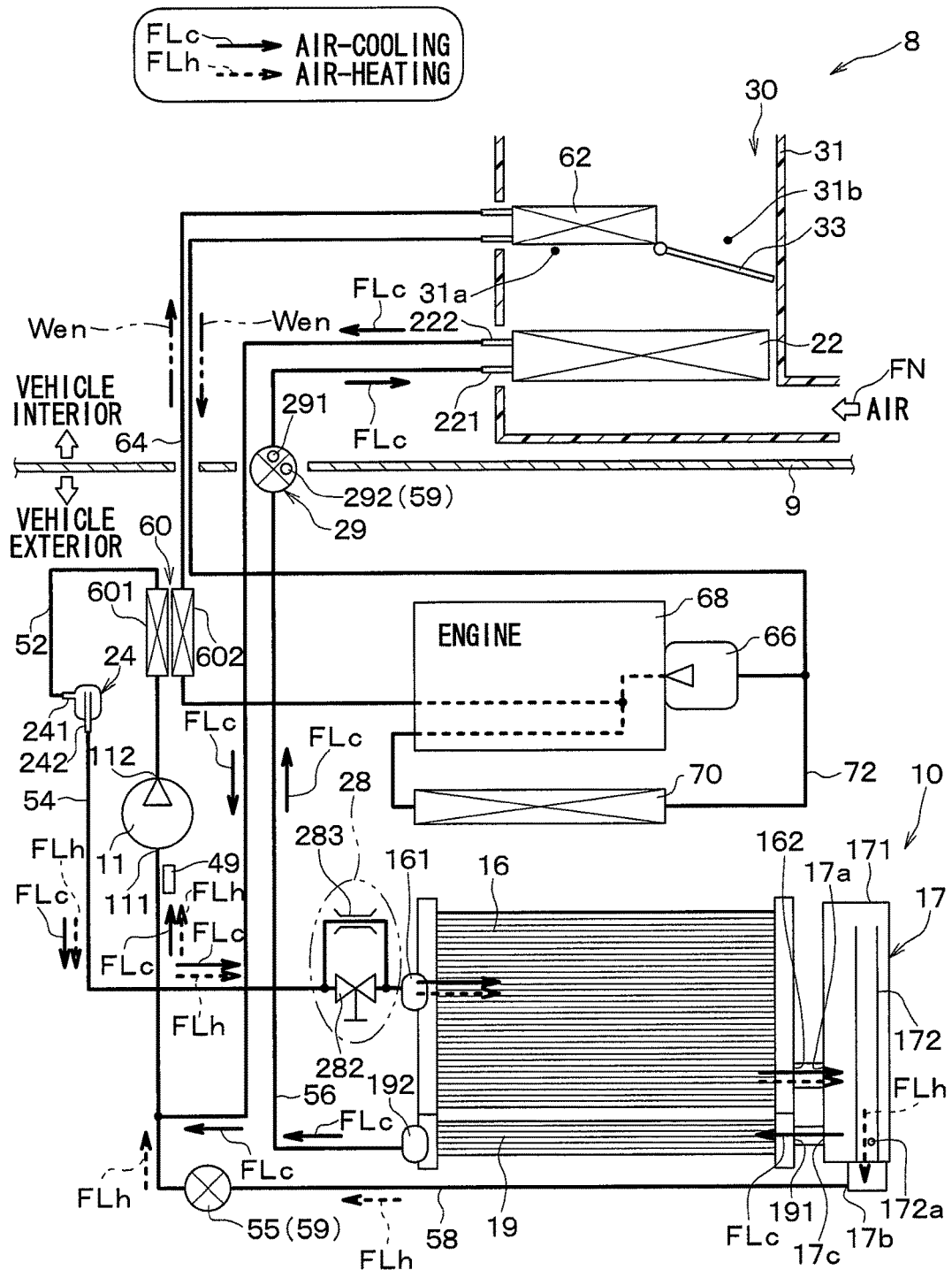
FIG. 4 is an entire configuration diagram of a vehicle air conditioner according to a second embodiment, which corresponds to FIG. 1 of the first embodiment.

FIG. 4 is an entire configuration diagram of the vehicle air conditioner 8 in this embodiment, which corresponds to FIG. 1 of the first embodiment. As shown in FIG. 4, in this embodiment, a water-cooled condenser 60 is provided in place of the condenser 12 described in the first embodiment, and a heater core 62 is provided in the hot-air passage 31a of the interior air-conditioning unit 30. Instead of the first expansion valve 28 of the first embodiment, a first decompression portion 28 is provided. In these points, this embodiment differs from the first embodiment. In this embodiment, like the first embodiment, the vehicle air conditioner 8 includes the electronic control unit 50. However, FIG. 4 omits the illustration of the electronic control unit 50. The same goes for the third or following embodiments to be described later.

The water-cooled condenser 60 includes a first heat exchanging portion 601 that is the known coolant-refrigerant heat exchanger to allow the refrigerant to flow therethrough, and a second heat exchanging portion 602 to allow an antifreeezing solution as an engine coolant to flow therethrough. The first heat exchanging portion 601 is disposed between the discharge port 112 of the compressor 11 and the first high-pressure pipe 52. The second heat exchanging portion 602 is provided in an antifreezing-fluid circulation circuit 64 through which the antifreezing fluid flows.

In the antifreezing-fluid circulation circuit 64, the antifreezing fluid is allowed to circulate by a coolant pump 66 as indicated by arrows Wen. The second heat exchanging portion 602 is disposed in series with the heater core 62 such that the antifreezing fluid flowing out of the second heat exchanging portion 602 returns to an engine 68 through the heater core 62. The antifreezing-fluid circulation circuit 64 is disposed in parallel with a radiator circuit 72 through which the antifreezing fluid circulates between the engine 68 and a radiator 70 of the vehicle.

The water-cooled condenser 60 with the above-mentioned structure exchanges heat between the refrigerant flowing through the first heat exchanging portion 601 and the antifreezing fluid flowing through the second heat exchanging portion 602, thereby cooling the refrigerant while heating the antifreezing fluid with the heat of the refrigerant.

Note that when the first refrigerant circuit is established, the electronic control unit 50 stops the flow of the antifreezing fluid in the antifreezing-fluid circulation circuit 64 by an on-off valve (not shown). Thus, in the establishment of the first refrigerant circuit, i.e., in the air-cooling mode of the refrigeration cycle device 10, the refrigerant flowing through the first heat exchanging portion 601 of the water-cooled condenser 60 passes through the first heat exchanging portion 601 almost without dissipating its heat. On the other hand, when the second refrigerant circuit is established, the electronic control unit 50 opens the antifreezing-fluid circulation circuit 64, enabling the antifreezing fluid to circulate through the antifreezing-fluid circulation circuit 64. Thus, in the establishment of the second refrigerant circuit, i.e., in the air-heating mode of the refrigeration cycle device 10, the refrigerant has its heat dissipated into the first heat exchanging portion 601 of the water-cooled condenser 60 and then flows into the first high-pressure pipe 52.

Specifically, the heater core 62 is disposed at the same position as that of the condenser 12 of the first embodiment within the casing 31 of the interior air-conditioning unit 30. That is, the heater core 62 is disposed in the hot-air passage 31a. The heater core 62 is a heat exchanger that exchanges heat between the antifreezing fluid flowing through the heater core 62 and the ventilation air passing through the heater core 62 in the hot-air passage 31a, thereby heating the ventilation air. Therefore, the water-cooled condenser 60 serves as a heat dissipation device that indirectly dissipates the heat held in the refrigerant discharged from the compressor 11 and flowing into the first heat exchanging portion 601, into the ventilation air via the antifreezing fluid and the heater core 62.

The first decompression portion 28 is disposed between the second high-pressure pipe 54 and the refrigerant inlet 161 of the exterior heat exchanger 16, like the first expansion valve 28 in the first embodiment. The first decompression portion 28 includes an on-off valve 282 and an orifice 283 as a fixed throttle that are arranged in parallel with each other between the second high-pressure pipe 54 and the refrigerant inlet 161 of the exterior heat exchanger 16.

Thus, when the on-off valve 282 is open, the refrigerant flowing from the second high-pressure pipe 54 into the first decompression portion 28 bypasses the orifice 283 and flows to the refrigerant inlet 161 of the exterior heat exchanger 16 through the on-off valve 282. That is, the state in which the on-off valve 282 is open corresponds to a state in which the first expansion valve 28 of the first embodiment is fully opened. In other words, the on-off valve 282 is open, thereby bringing the operating state of the first decompression portion 28 into the open state.

When the on-off valve 282 is closed, the refrigerant flowing from the second high-pressure pipe 54 into the first decompression portion 28 passes through the orifice 283, to be decompressed and expanded by the orifice 283, and then flows to the refrigerant inlet 161 of the exterior heat exchanger 16. That is, the on-off valve 282 is closed, thereby bringing the operating state of the first decompression portion 28 into the decompression state. In other words, the on-off valve 282 serves as an operation switching portion that switches the first decompression portion 28 between the open state and the decompression state. The on-off valve 282 is an electromagnetic on-off valve that is controlled, for example, by a control signal from the electronic control unit 50. The orifice 283 of the first decompression portion 28, i.e., the fixed throttle structurally and spontaneously adjusts the subcooling degree of the refrigerant flowing out of the fixed throttle.

In this embodiment, the effects exhibited by the structure common to that in the first embodiment described above can be obtained in the same manner as the first embodiment.

Third Embodiment

A third embodiment of the present disclosure will be described. In this embodiment, different points from the first embodiment described above will be mainly described below.

Figure 5:
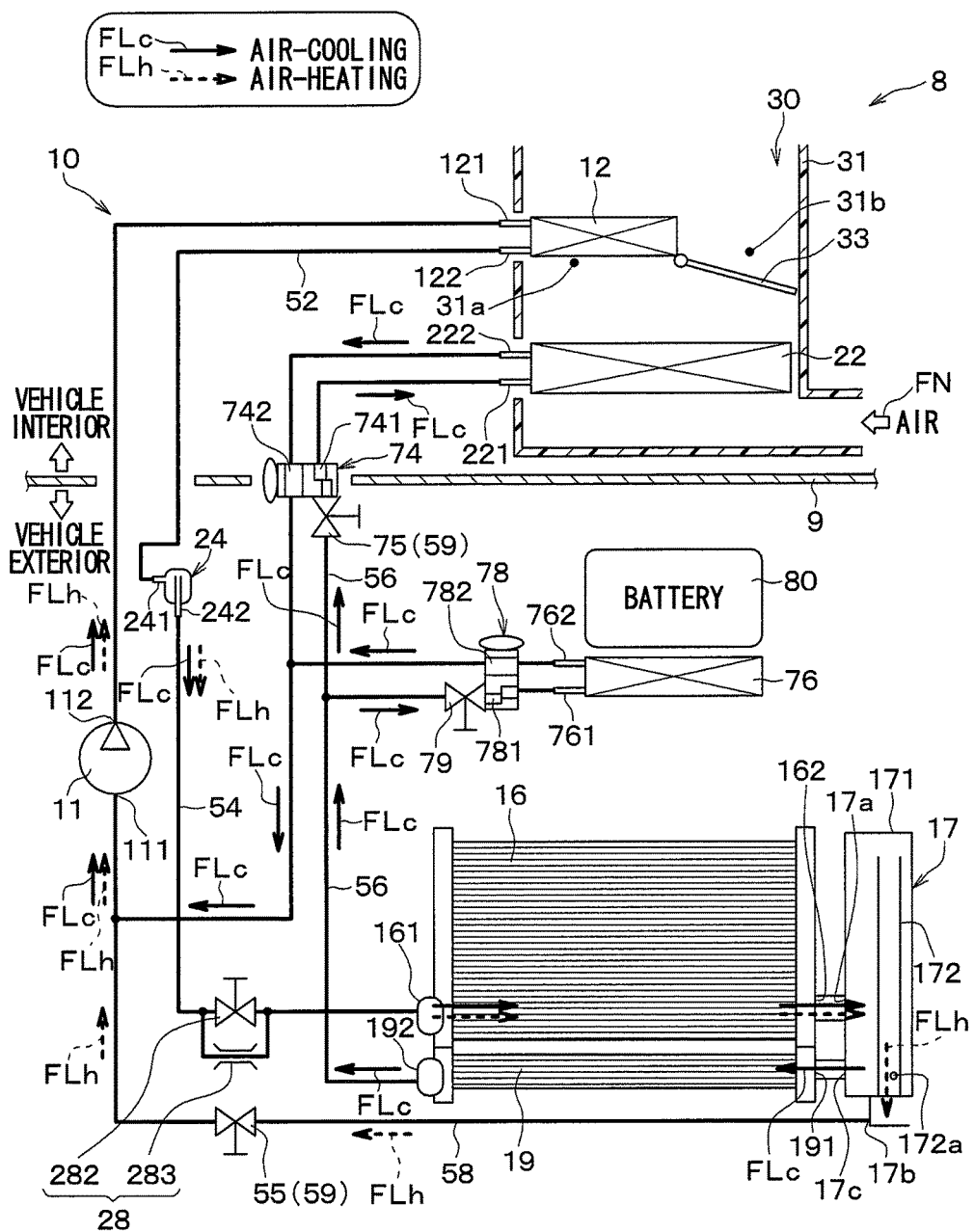
FIG. 5 is an entire configuration diagram of a vehicle air conditioner according to a third embodiment, which corresponds to FIG. 1 of the first embodiment.

FIG. 5 is an entire configuration diagram of the vehicle air conditioner 8 in this embodiment, which corresponds to FIG. 1 of the first embodiment. As shown in FIG. 5, in this embodiment, the second expansion valve 29 of the first embodiment is replaced by a first thermal expansion valve 74 and a first on-off valve 75, and the first expansion valve 28 of the first embodiment is replaced by the first decompression portion 28 that is the same as that in the second embodiment. The refrigeration cycle device 10 includes a second evaporator 76, a second thermal expansion valve 78, and a second on-off valve 79. This embodiment differs from the first embodiment in these points. Note that the vehicle on which the vehicle air conditioner 8 in this embodiment is mounted is a hybrid vehicle and includes a battery 80 as the power source for the traveling motor. In this embodiment, the evaporator 22 is hereinafter referred to as the "first evaporator 22".

The first thermal expansion valve 74 is the known thermal-sensitive mechanical expansion valve that decompresses and expands the refrigerant flowing into the refrigerant inlet 221 of the first evaporator 22 by a mechanical mechanism. Specifically, the refrigerant is decompressed and expanded such that the superheat degree of the refrigerant at the outlet side of the evaporator, which is the refrigerant flowing out of the refrigerant outlet 222 of the first evaporator 22, is within a predetermined range previously set. In other words, the first thermal expansion valve 74 adjusts the superheat degree of the refrigerant at the refrigerant outlet 222 of the first evaporator 22. The first thermal expansion valve 74 is widely used in vehicle air conditioners, and does not need the control by the electronic control unit 50 as it is made up of a mechanical system.

Specifically, the first thermal expansion valve 74 includes a decompression portion 741 interposed between the refrigerant outlet 192 of the subcooler 19 and the refrigerant inlet 221 of the first evaporator 22, and a thermal-sensitive portion 742 interposed between the refrigerant outlet 222 of the first evaporator 22 and the suction port 111 of the compressor 11. The thermal-sensitive portion 742 detects the superheat degree of a refrigerant at the outlet side of the evaporator based on the temperature and pressure of the refrigerant. The decompression portion 741 decompresses the refrigerant at the outlet side of the evaporator by throttling the refrigerant flow in accordance with its temperature and pressure. In other words, the decompression portion 741 serves as a second decompression portion that decompresses the refrigerant flowing out of the liquid-phase refrigerant outlet 17c of the gas-liquid separator 17 via the subcooler 19.

The first on-off valve 75 is provided at the refrigerant-flow upstream side with respect to the decompression portion 741 of the first thermal expansion valve 74, i.e., at the refrigerant inlet of the decompression portion 741. The first on-off valve 75 is a valve mechanism that opens and closes the first route 56 in accordance with the control signal output from the electronic control unit 50. Therefore, the first on-off valve 75 functions as a first route opening/closing portion for opening and closing the first route 56. The first on-off valve 75 and the on-off valve 55 provided in the second route 58 configure the switching device 59 described above.

The first on-off valve 75 is integrally configured with the first thermal expansion valve 74, for example, by being bolted to the first thermal expansion valve 74. Note that the first on-off valve 75 may be positioned in any site other than the refrigerant inlet of the decompression portion 741 as long as it is provided in the first route 56.

The second thermal expansion valve 78 is an expansion valve that has substantially the same structure as the first thermal expansion valve 74 and is disposed in parallel with the first thermal expansion valve 74. That is, the second thermal expansion valve 78 includes a decompression portion 781 and a thermal-sensitive portion 782. The decompression portion 781 has substantially the same structure as the decompression portion 741 of the first thermal expansion valve 74. The thermal-sensitive portion 782 has the substantially the same structure as the thermal-sensitive portion 742 of the first thermal expansion valve 74. The refrigerant flows into the decompression portion 781 of the second thermal expansion valve 78 from the refrigerant outlet 192 of the subcooler 19. Meanwhile, the refrigerant having flowed out of the thermal-sensitive portion 782 of the second thermal expansion valve 78 flows toward the suction port 111 of the compressor 11.

The second evaporator 76 is a cooler that cools the battery 80 by absorbing its heat in the refrigerant flowing through the second evaporator 76. The second evaporator 76 is an evaporator that has substantially the same structure as that of the first evaporator 22 provided in the interior air-conditioning unit 30. The second evaporator 76 includes a refrigerant inlet 761 into which the refrigerant flows from the decompression portion 781 and a refrigerant outlet 762 through which the refrigerant after the heat exchange within the second evaporator 76 flows toward the thermal-sensitive portion 782 of the second thermal expansion valve 78.

The second on-off valve 79 is a valve mechanism that has substantially the same structure as the first on-off valve 75. The second on-off valve 79 opens and closes the refrigerant route that allows the refrigerant to circulate toward the second thermal expansion valve 78 and the second evaporator 76 in accordance with a control signal output from the electronic control unit 50. The second on-off valve 79 is disposed at the refrigerant-flow upstream side with respect to the decompression portion 781 of the second thermal expansion valve 78, i.e., at the refrigerant inlet of the decompression portion 781. For example, the second on-off valve 79 is integrally configured with the second thermal expansion valve 78, for example, by being bolted to the second thermal expansion valve 78.

The second on-off valve 79 is open, and together with the open state thereof, the on-off valve 282 for the first decompression portion 28 is also open while the on-off valve 55 for the second route 58 is closed, whereby a battery-cooling refrigerant circuit for the second evaporator 76 to cool the battery 80 is established. That is, the refrigerant discharged by the compressor 11 is allowed to circulate through the battery-cooling refrigerant circuit, thus causing the second evaporator 76 to cool the battery 80. Therefore, when the air-heating second refrigerant circuit is established, the on-off valve 55 is open, whereby the second evaporator 76 does not cool the battery as the battery-cooling refrigerant circuit is not established. To establish the second refrigerant circuit, the electronic control unit 50 (see FIG. 1) closes the first on-off valve 75 and also closes the second on-off valve 79.

In this embodiment, the effects exhibited by the structure common to that in the first embodiment described above can be obtained in the same manner as the first embodiment.

Note that this embodiment is a modified example based on the first embodiment, but can be combined with the second embodiment described above.

Fourth Embodiment

A fourth embodiment of the present disclosure will be described. Different points of this embodiment from the above-mentioned second embodiment will be mainly described below.

Figure 6:
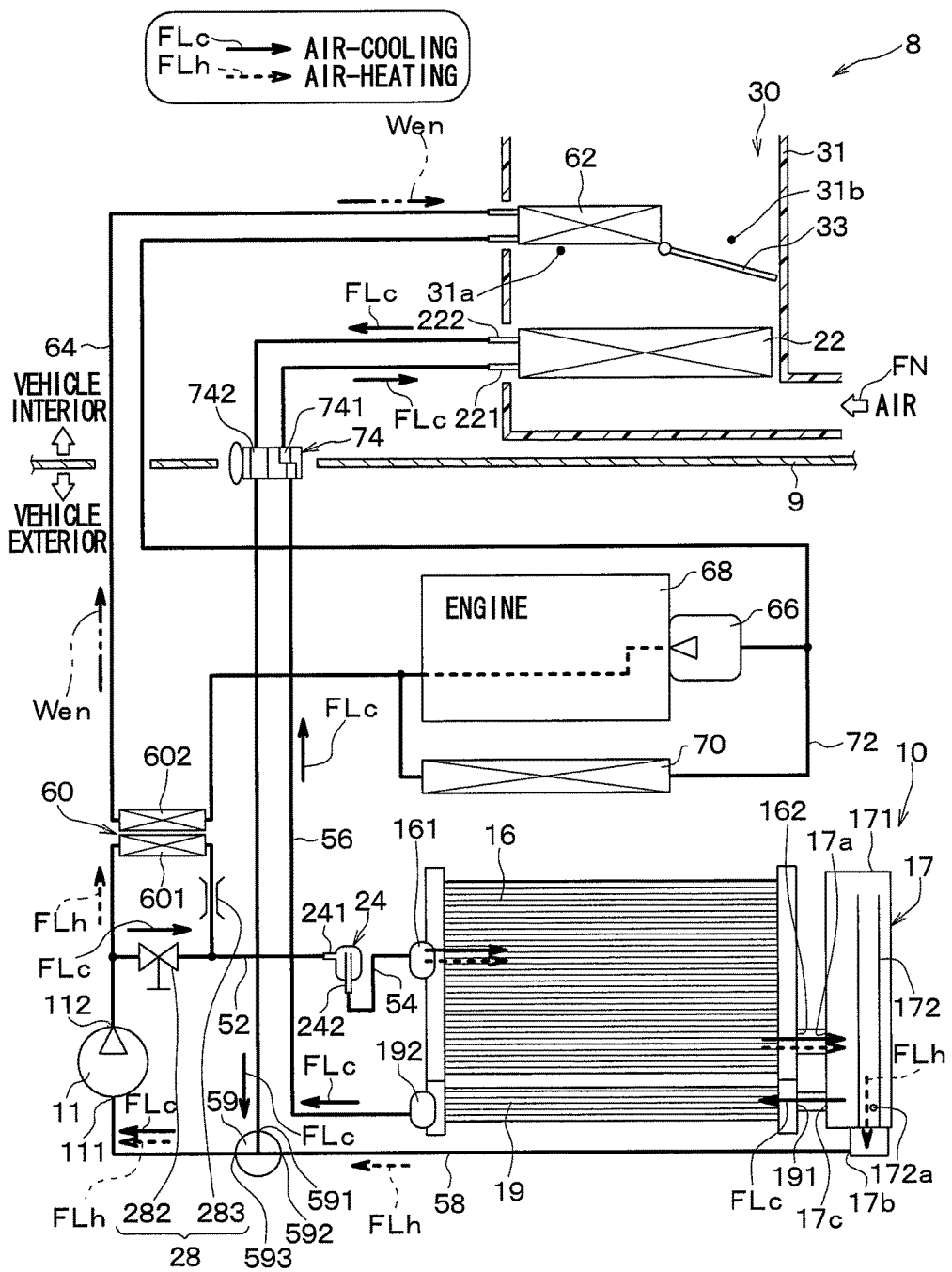
FIG. 6 is an entire configuration diagram of a vehicle air conditioner according to a fourth embodiment, which corresponds to FIG. 4 of the second embodiment.

FIG. 6 is an entire configuration diagram of the vehicle air conditioner 8 in this embodiment, which corresponds to FIG. 4 of the second embodiment. As illustrated in FIG. 6, this embodiment differs from the second embodiment in the coupling structure between the first decompression portion 28 and the first heat exchanging portion 601 of the water-cooled condenser 60 and in the arrangement of the oil separator 24. In this embodiment, the second expansion valve 29 and the on-off valve 55 in the second embodiment are replaced by the first thermal expansion valve 74 and the switching device 59, respectively. The first thermal expansion valve 74 shown in FIG. 6 is substantially the same as that in the third embodiment.

Like in the second embodiment, the first decompression portion 28 includes the on-off valve 282 and the orifice 283. The arrangement of the on-off valve 282 in this embodiment differs from that in the second embodiment. This embodiment is the same as the second embodiment in that the orifice 283 of the first decompression portion 28 is connected in series with the refrigerant-flow downstream side with respect to the first heat exchanging portion 601 of the water-cooled condenser 60. However, the on-off valve 282 of the first decompression portion 28 is provided in parallel with the first heat exchanging portion 601 and the orifice 283.

When the on-off valve 282 is open, the refrigerant discharged from the compressor 11 passes through the on-off valve 282 while bypassing the first heat exchanging portion 601 and the orifice 283, and then flows to the refrigerant-flow downstream side of the on-off valve 282 and orifice 283 through the on-off valve 282. In this case, the refrigerant barely flows to the first heat exchanging portion 601 of the water-cooled condenser 60 due to flow resistance of the refrigerant. Thus, to stop the heat exchange between the antifreezing fluid and refrigerant in the water-cooled condenser 60, it is not necessary to halt the flow of the antifreezing fluid in the antifreezing-fluid circulation circuit 64.

On the other hand, when the on-off valve 282 is closed, the refrigerant discharged from the compressor 11 passes through the first heat exchanging portion 601 and the orifice 283 in this order, is decompressed and expanded by the orifice 283, and then flows toward the refrigerant-flow downstream side of the on-off valve 282 and the orifice 283.

The oil separator 24 in this embodiment is provided not in the refrigerant route that leads from the first heat exchanging portion 601 of the water-cooled condenser 60 to the first decompression portion 28, but in the refrigerant route that leads from the first decompression portion 28 to the refrigerant inlet 161 of the exterior heat exchanger 16. Thus, the upstream end of the first high-pressure pipe 52 is connected to the on-off valve 282 and orifice 283 of the first decompression portion 28, while the downstream end of the first high-pressure pipe 52 is connected to the refrigerant inlet portion 241 of the oil separator 24. Furthermore, the upstream end of the second high-pressure pipe 54 is connected to the refrigerant outlet portion 242 of the oil separator 24, while the downstream end of the second high-pressure pipe 54 is connected to the refrigerant inlet 161 of the exterior heat exchanger 16.

The switching device 59 is an electromagnetic three-way valve that has a first inlet port 591, a second inlet port 592, and an outlet port 593. The switching device 59 is controlled, for example, by a control signal output from the electronic control device 50. The first inlet port 591 of the switching device 59 is connected to the refrigerant outlet 222 of the evaporator 22 via the thermal-sensitive portion 742 of the first thermal expansion valve 74. The second inlet port 592 is connected to the gas-phase refrigerant outlet 17b of the gas-liquid separator 17. The outlet port 593 is connected to the suction port 111 of the compressor 11.

The switching device 59 selectively switches between a first switching position for closing the second inlet port 592 while communicating the first inlet port 591 with the outlet port 593, and a second switching position for communicating the second inlet port 592 with the outlet port 593 while closing the first inlet port 591. Therefore, the switching device 59 has functions of a first route opening/closing portion and a second route opening/closing portion. The first route opening/closing portion opens and closes the first route 56 for the refrigerant that leads from the liquid-phase refrigerant outlet 17c of the gas-liquid separator 17 to the suction port 111 of the compressor 11. The second route opening/closing portion opens and closes the second route 58 for the refrigerant that leads from the gas-phase refrigerant outlet 17b of the gas-liquid separator 17 to the suction port 111 of the compressor 11.

The switching device 59 establishes the air-cooling first refrigerant circuit by being switched to the first switching position, and establishes the air-heating second refrigerant circuit by being switched to the second switching position. Thus, the switching device 59 is switched to the first switching position in step S03 of the flowchart in FIG. 3, and switched to the second switching position in step S05 of the flowchart in FIG. 3.

In this embodiment, the effects exhibited by the structure common to that in the second embodiment described above can be obtained in the same manner as the second embodiment.

Note that this embodiment is a modified example based on the second embodiment, but can also be combined with either the first or third embodiment described above.

Fifth Embodiment

A fifth embodiment of the present disclosure will be described. In this embodiment, different points from the first embodiment described above will be mainly described below.

Figure 7:
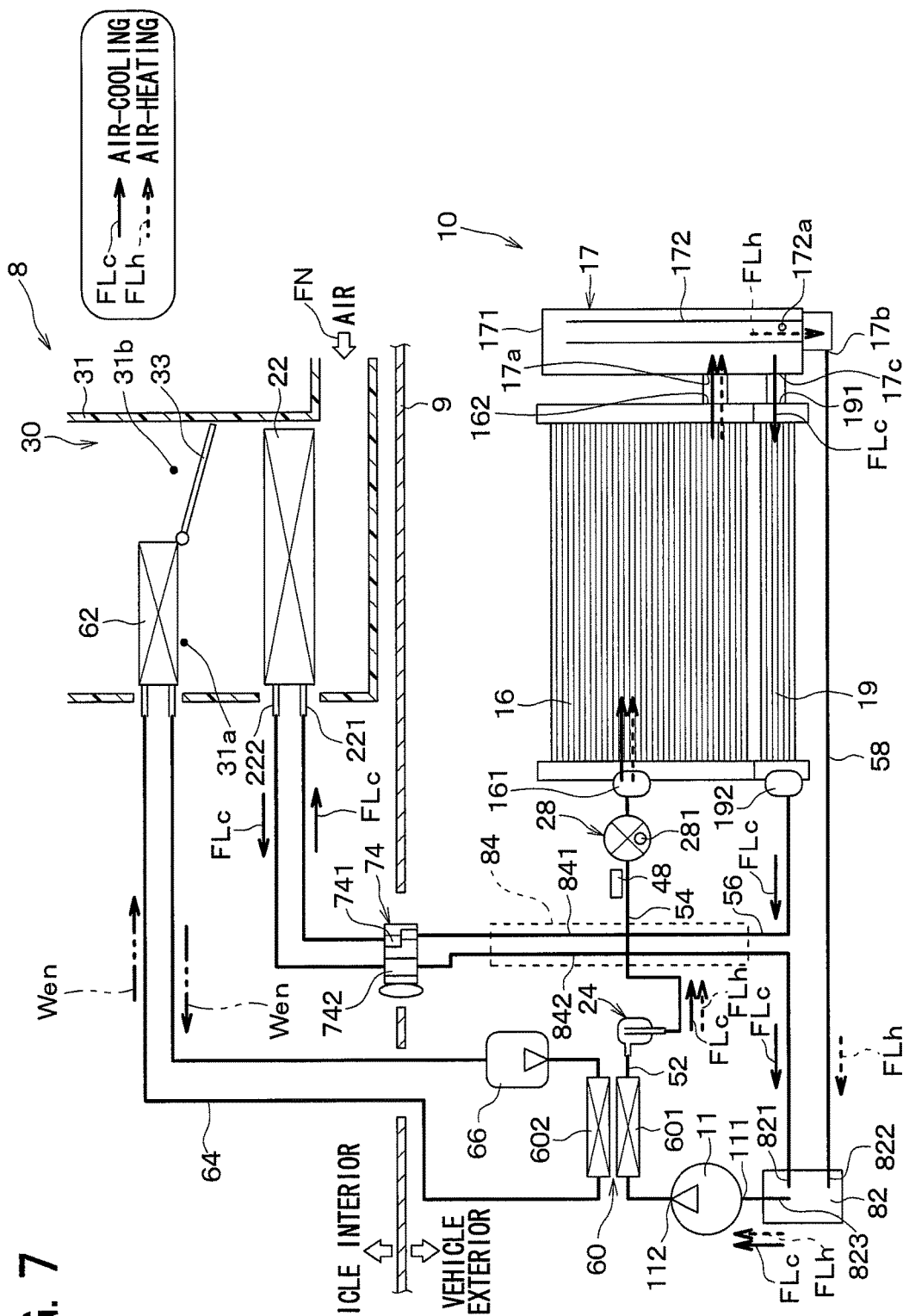
FIG. 7 is an entire configuration diagram of a vehicle air conditioner according to a fifth embodiment, which corresponds to FIG. 1 of the first embodiment.

FIG. 7 is an entire configuration diagram of the vehicle air conditioner 8 in this embodiment, which corresponds to FIG. 1 of the first embodiment. As shown in FIG. 7, in this embodiment, the water-cooled condenser 60 of the second embodiment is provided in place of the condenser 12 of the first embodiment, and the heater core 62 of the second embodiment is provided in the hot-air passage 31a of the interior air-conditioning unit 30. In this embodiment, the second expansion valve 29 and the on-off valve 55 in the first embodiment are replaced by a switching device 82 and the first thermal expansion valve 74, respectively, and additionally an internal heat exchanger 84. This embodiment differs from the first embodiment in these points. The first thermal expansion valve 74 shown in FIG. 7 is substantially the same as that in the third embodiment.

In the antifreezing-fluid circulation circuit 64 of this embodiment, the coolant pump 66 is provided, like the second embodiment. In the antifreezing-fluid circulation circuit 64, the antifreezing fluid as the heat-exchange medium is allowed to circulate "from the coolant pump 66 to the second heat exchanging portion 602 of the water-cooled condenser 60, the heater core 62, and the coolant pump 66" in this order by means of the coolant pump 66 as indicated by the arrows Wen. Note that when the first refrigerant circuit is established, the electronic control unit 50 (see FIG. 1) halts the flow of the coolant pump 66 to thereby stop the flow of the antifreezing fluid in the antifreezing-fluid circulation circuit 64, like the second embodiment.

Figure 8:
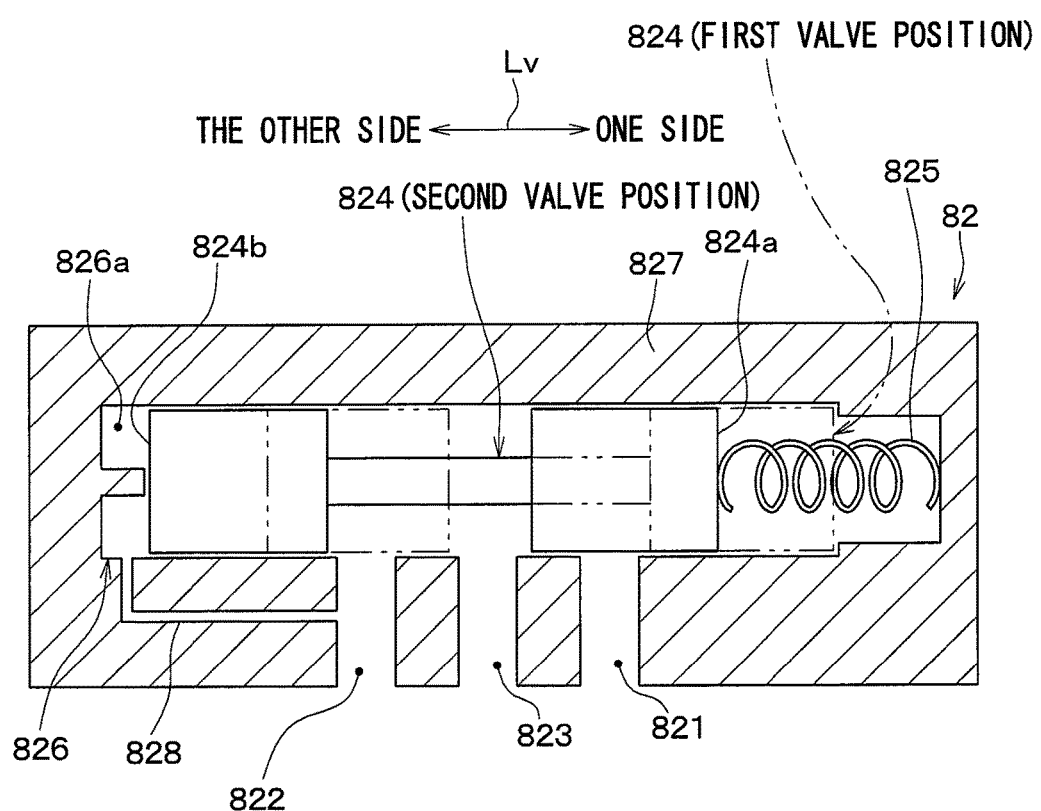
FIG. 8 is a schematic cross-sectional view of an internal structure of a switching device in the fifth embodiment.

The switching device 82 is a pilot-pressure driven three-way valve that includes connection passages 821, 822, and 823 as three connection ports. Specifically, the switching device 82 has the compressor connection passage 823 as an outlet port connected to the suction port 111 of the compressor 11; the first connection passage 821 as a first inlet port connected to the refrigerant outlet 222 of the evaporator via the thermal-sensitive portion 742 of the first thermal expansion valve 74; and the second connection passage 822 as a second inlet port connected to the gas-phase refrigerant outlet 17b of the gas-liquid separator 17. As shown in FIG. 8, the switching device 82 includes a switching valve body 824, an urging member 825, and a pressure-chamber formation portion 826 within the switching device 82.

FIG. 8 is a schematic cross-sectional view of an internal structure of the switching device 82. As shown in FIG. 8, the switching valve body 824 of the switching device 82 is accommodated within a housing 827 of the switching device 82 in such a manner as to be movable in one axial direction Lv. The switching valve body 824 is moved between a first valve position where one end of the stroke is located in the one axial direction Lv and a second valve position where the other end of the stroke is located in the one axial direction Lv. Specifically, the switching valve body 824 is selectively switched to either the first valve position or the second valve position.

Referring to FIG. 8, the switching valve body 824 located at the first valve position is indicated by an alternate long and two short dashes line, while the switching valve body 824 located at the second valve position is indicated by a solid line. That is, in the first valve position, the switching valve body 824 communicates the first connection passage 821 with the compressor connection passage 823, while closing the second connection passage 822. On the other hand, in the second valve position, the switching valve body 824 communicates the second connection passage 822 with the compressor connection passage 823, while closing the first connection passage 821.

As can be seen from FIG. 7, the switching device 82 in this embodiment functionally includes a first route opening/closing portion and a second route opening/closing portion, like the switching device 59 in the fourth embodiment. The first route opening/closing portion opens and closes the first route 56 for the refrigerant that leads from the liquid-phase refrigerant outlet 17c of the gas-liquid separator 17 to the suction port 111 of the compressor 11. The second route opening/closing portion opens and closes the second route 58 for the refrigerant that leads from the gas-phase refrigerant outlet 17b of the gas-liquid separator 17 to the suction port 111 of the compressor 11. The switching device 82 establishes the air-cooling first refrigerant circuit by switching the switching valve body 824 to the first switching position, and establishes the air-heating second refrigerant circuit by switching the switching valve body 824 to the second switching position.

As shown in FIG. 8, the urging member 825 of the switching device 82 is a coil spring that extends and contracts in one axial direction Lv. The urging member 825 is disposed on one side in the one axial direction Lv with respect to the switching valve body 824. The urging member 825 presses one-side end surface 824a located at one side of the switching valve body 824 to thereby urge the switching valve body 824 toward the other side thereof. That is, the urging member 825 urges the switching valve body 824 toward the second valve position.

The pressure-chamber formation portion 826 is provided with a pressure chamber 826a into which the refrigerant is introduced. The pressure chamber 826a is disposed on the other side in the one axial direction Lv with respect to the switching valve body 824. The refrigerant pressure within the pressure chamber 826a acts on the other-side end surface 824b located at the other side of the switching valve body 824. That is, the pressure-chamber formation portion 826 causes the refrigerant pressure in the pressure chamber 826a to press the switching valve body 824 toward the first valve position on the one side in the one axial direction Lv against the urging force by the urging member 825.

A pilot refrigerant passage 828 is formed in the housing 827 of the switching device 82. The pilot refrigerant passage 828 communicates the pressure chamber 826a with the second connection passage 822. Thus, the refrigerant having flowed out of the gas-phase refrigerant outlet 17b of the gas-liquid separator 17 (see FIG. 7) is introduced into the pressure chamber 826a via the second connection passage 822 and the pilot refrigerant passage 828. That is, the refrigerant pressure in the pressure chamber 826a is set substantially equal to that in the gas-liquid separator 17 by the pilot refrigerant passage 828.

Like the first embodiment, the first expansion valve 28 shown in FIG. 7 is switched to the open state in step S03 shown in FIG. 3, and to the decompression state in step S05 shown in FIG. 3. The refrigerant pressure in the gas-liquid separator 17 shown in FIG. 7 becomes substantially equal to the discharge refrigerant pressure at the discharge port 112 of the compressor 11 when the first expansion valve 28 is in the open state. On the other hand, the refrigerant pressure in the gas-liquid separator 17 becomes substantially equal to the suction refrigerant pressure at the suction port 111 of the compressor 11 when the first expansion valve 28 is in the decompression state. Therefore, for instance, when switching the first expansion valve 28 from the open state to the decompression state, the refrigerant pressure in the pressure chamber 826a (see FIG. 8), which is substantially equal to that in the gas-liquid separator 17, is switched in stages. Specifically, the refrigerant pressure in the pressure chamber 826a is switched from a high-pressure side pressure, which is substantially equal to the above-mentioned discharge refrigerant pressure, to a low-pressure side pressure, which is lower than the high-pressure side pressure but substantially equal to the above-mentioned suction refrigerant pressure.

The urging force, i.e., a spring constant of the urging member 825 shown in FIG. 8 is set such that the switching valve body 824 is switched to the first valve position when the refrigerant pressure in the pressure chamber 826a becomes the high-pressure side pressure. Furthermore, the urging force of the urging member 825 is set such that the switching valve body 824 is switched to the second valve position when the refrigerant pressure in the pressure chamber 826a becomes the low-pressure side pressure. In detail, when the refrigerant pressure in the pressure chamber 826a takes a value that brings the first expansion valve 28 into the open state, i.e., at the above-mentioned high-pressure side pressure, the urging member 825 allows the switching valve body 824 to be switched to the first valve position by the refrigerant pressure in the pressure chamber 826a. On the other hand, when the refrigerant pressure in the pressure chamber 826a takes a value that brings the first expansion valve 28 into the decompression state, i.e., at the above-mentioned low-pressure side pressure, the urging member 825 switches the switching valve body 824 to the second valve position.

As shown in FIG. 7, the internal heat exchanger 84 is the known internal heat exchanger provided in the refrigeration cycle device, and includes a first heat exchanging portion 841 and a second heat exchanging portion 842 through which the refrigerant flows. The first heat exchanging portion 841 is disposed in a region from the refrigerant outlet 192 of the subcooler 19 to the decompression portion 741 of the first thermal expansion valve 74. The second heat exchanging portion 842 is disposed in a region from the thermal-sensitive portion 742 of the first thermal expansion valve 74 to the first connection passage 821 of the switching device 82. The internal heat exchanger 84 exchanges heat between the refrigerant flowing through the first heat exchanging portion 841 and the refrigerant flowing through the second heat exchanging portion 842.

Specifically, when the first refrigerant circuit (the refrigerant flow as indicated by solid arrows FLc) is established, the refrigerant flows through the first heat exchanging portion 841 and the second heat exchanging portion 842. In this case, the first heat exchanging portion 841 is on the high-temperature side, while the second heat exchanging portion 842 is on the low-temperature side. Therefore, the heat exchange at the internal heat exchanger 84 cools the refrigerant in the first heat exchanging portion 841, while heating the refrigerant in the second heat exchanging portion 842.

In this embodiment, the effects exhibited by the structure common to that in the first embodiment described above can be obtained in the same manner as the first embodiment.

Furthermore, in this embodiment, when the refrigerant pressure in the pressure chamber 826a takes a value that brings the first expansion valve 28 into the open state, the urging member 825 of the switching device 82 allows the switching valve body 824 to be switched to the first valve position by the refrigerant pressure in the pressure chamber 826a. On the other hand, when the refrigerant pressure in the pressure chamber 826a takes a value that brings the first expansion valve 28 into the decompression state, the urging member 825 allows the switching valve body 824 to be switched to the second valve position. Therefore, the switching device 82 does not need to be electrically switched under control, and the first refrigerant circuit and the second refrigerant circuit can be selectively established automatically in conjunction with the selective switching of the first expansion valve 28 to either the open state or the decompression state.

Other Embodiments (1) Although in the above-mentioned respective embodiments, the ventilation-air-passage switching door 33 of the interior air-conditioning unit 30 is positioned at either the first door position or the second door position, the switching door 33 may be rotatably controlled to be positioned at an intermediate position between the first and second door positions.

(2) Although in the above-mentioned respective embodiments, the compressor 11 is an electric compressor, the compressor may be a belt-driven compressor that is connected to an engine via a belt and driven by the power from the engine.

(3) Although in the above-mentioned first embodiment, the oil separator 24 is provided in the refrigerant route that leads from the condenser 12 to the first expansion valve 28, the oil separator may be provided at any site in a refrigerant route that leads from the discharge port 112 of the compressor 11 to the refrigerant inlet 161 of the exterior heat exchanger 16. For instance, the oil separator 24 may be provided in the refrigerant route that leads from the discharge port 112 of the compressor 11 to the condenser 12. The same goes for the arrangements of the oil separator 24 in the second to fifth embodiments.

(4) In the above-mentioned fourth embodiment, the first decompression portion 28 and the water-cooled condenser 60 are separate devices. However, the first decompression portion 28 and the water-cooled condenser 60 may be integrally configured by being bolted together or the like.

(5) In the above-mentioned second and fourth embodiments, the engine 68 serves as a heating heat source for heating the antifreezing fluid that circulates through the antifreezing-fluid circulation circuit 64. However, the antifreezing fluid may be heated by a heating heat source other than the engine 68, for example, an electric heater. Alternatively, the antifreezing fluid flowing through the heater core 62 may not be heated by the engine 68, the electric heater or the like, but instead may be heated by the water-cooled condenser 60 only.

(6) In the above-mentioned second to fourth embodiments, the first decompression portion 28 has one fixed throttle, which is the orifice 283. Alternatively, the first decompression portion 28 may include a plurality of fixed throttles and configured to make its throttle opening adjustable in multiple stages.

(7) In the above-mentioned respective embodiments, the refrigeration cycle device 10 includes the subcooler 19. However, the refrigeration cycle device may not include the subcooler 19.

(8) In the above-mentioned third embodiment, the second evaporator 76 cools the battery 80 by causing the heat of the battery to be absorbed in the refrigerant flowing through the second evaporator 76. However, the second evaporator 76 does not need to cool the battery 80 directly. For instance, the second evaporator 76 may indirectly cool the battery 80 via the antifreezing fluid that circulates between the second evaporator 76 and the battery 80.

(9) In the above-mentioned respective embodiments, the processing in each step of the flowchart shown in FIG. 3 is executed by a computer program, but may be configured of a hard logic.

It is noted that the present disclosure is not limited to the above-mentioned embodiments, and that various modifications and changes can be made to the disclosed embodiments within the scope of claims as appropriate. The above-mentioned respective embodiments are not irrelevant to each other, and any appropriate combination between them may be implemented except when their combination seems obviously impossible. The components configuring the respective embodiments described above are not necessarily essential unless otherwise specified and except when clearly considered to be essential in principle. Even when referring to a specific number about the component of the embodiments and the like, including the number of the component, a numerical value, an amount, a range, and the like, in the respective embodiments described above, the embodiments are not limited to the specific numbers unless otherwise specified, and except when obviously limited to the specific number in principle. Even when referring to the material, shape, and positional relationship of the components and the like in the respective embodiments described above, the embodiments are not limited to such a material, shape, or positional relationship unless otherwise specified and except when obviously limited to the specific material, shape, positional relationship, and the like in principle.

What is claimed is:

1. A refrigeration cycle device comprising:
a compressor that draws, compresses, and discharges a refrigerant;
a heat dissipation device that dissipates heat held in the refrigerant discharged from the compressor, into a ventilation air which is to be blown into a space to be air-conditioned;
a first decompression portion that decompresses the refrigerant flowing out of the heat dissipation device;
an exterior heat exchanger that exchanges heat between the refrigerant flowing out of the first decompression portion and outside air;
a gas-liquid separator that separates the refrigerant flowing out of the exterior heat exchanger into a gas-phase refrigerant and a liquid-phase refrigerant, the gas-liquid separator having a gas-phase refrigerant outlet from which the gas-phase refrigerant flows and a liquid-phase refrigerant outlet from which the liquid-phase refrigerant flows;
a second decompression portion that decompresses the refrigerant flowing out of the liquid-phase refrigerant outlet of the gas-liquid separator;
an evaporator that evaporates the refrigerant by exchanging heat between the refrigerant flowing out of the second decompression portion and the ventilation air;
a switching device configured to be selectively switchable between a first refrigerant circuit and a second refrigerant circuit, wherein the first refrigerant circuit is configured to cause the refrigerant discharged from the compressor to flow into the gas-liquid separator while flowing out of the liquid-phase refrigerant outlet of the gas-liquid separator and then to cause the refrigerant from the liquid-phase refrigerant outlet to flow sequentially into the second decompression portion and the evaporator to be drawn into the compressor, and the second refrigerant circuit is configured to cause the refrigerant discharged from the compressor to flow into the gas-liquid separator while flowing out of the gas-phase refrigerant outlet of the gas-liquid separator, and then to cause the refrigerant from the gas-phase refrigerant outlet to be drawn into the compressor; and
an oil separator provided in a refrigerant passage from the compressor to the exterior heat exchanger, the oil separator being configured to separate oil from the refrigerant containing the oil and flowing into the oil separator from a refrigerant-flow upstream side of the oil separator and then to cause the refrigerant after the separation to flow out toward a refrigerant-flow downstream side of the oil separator, while retaining the oil when the first refrigerant circuit is set, wherein
the oil separator includes a tank forming an oil reservoir space that retains the oil separated from the refrigerant, a refrigerant inlet portion through which the refrigerant flows from the refrigerant-flow upstream side of the oil separator into the oil reservoir space, and a refrigerant outlet portion that causes the refrigerant within the oil reservoir space to flow out toward the refrigerant-flow downstream side of the oil separator, wherein the oil separator is provided downstream the heat dissipation device and upstream the first decompression portion in the refrigerant passage from the compressor to the exterior heat exchanger, and
wherein the refrigeration device is configured such that when the second circuit is circulating refrigerant, the refrigerant in the gas liquid separator flows out of the gas-phase refrigerant outlet without flowing out of the liquid-phase refrigerant outlet, and the liquid-phase refrigerant after condensation in the heat dissipation device flows into the tank of the oil separator.

2. The refrigeration cycle device according to claim 1, wherein
the refrigerant outlet portion of the oil separator has an in-reservoir-space inlet that is open within the oil reservoir space at a level higher than a liquid surface of the oil retained in the oil reservoir space when the first refrigerant circuit is circulating refrigerant, the refrigerant outlet portion being configured to cause the refrigerant flowing into the oil separator from the in-reservoir-space inlet to flow out toward the refrigerant-flow downstream side of the oil separator.

3. The refrigeration cycle device according to claim 1, wherein the refrigeration cycle device is further configured to have the first decompression portion be set to an open state of causing the refrigerant flowing into the first decompression portion to flow out toward the exterior heat exchanger in connection with the first refrigerant circuit circulating refrigerant by the switching device, and is set to a decompression state of decompressing the refrigerant flowing into the first decompression portion more than in the open state and then causing the decompressed refrigerant to flow out toward the exterior heat exchanger in connection with the second refrigerant circuit circulating refrigerant by the switching device,
in the open state of the first decompression portion, a pressure of the refrigerant flowing out of the first decompression portion is set at a value that makes a temperature of the refrigerant higher than a temperature of the outside air in the exterior heat exchanger, and
in the decompression state of the first decompression portion, a pressure of the refrigerant flowing out of the first decompression portion is set at a value that makes the temperature of the refrigerant lower than a temperature of the outside air in the exterior heat exchanger.

4. The refrigeration cycle device according to claim 1, wherein
the compressor has a suction port that draws the refrigerant,
the first decompression portion is configured to be set to either an open state of causing the refrigerant flowing into the first decompression portion to flow toward the exterior heat exchanger or a decompression state of decompressing the refrigerant flowing into the first decompression portion more than in the open state and causing the decompressed refrigerant to flow toward the exterior heat exchanger,
in the open state of the first decompression portion, a pressure of the refrigerant flowing out of the first decompression portion is set at a value that makes a temperature of the refrigerant higher than a temperature of the outside air in the exterior heat exchanger, in the decompression state of the first decompression portion, a pressure of the refrigerant flowing out of the first decompression portion is set at a value that makes the temperature of the refrigerant lower than a temperature of the outside air in the exterior heat exchanger, the switching device includes:

a compressor connection passage connected to a suction port of the compressor;

a first connection passage connected to the evaporator;

a second connection passage connected to the gas-phase refrigerant outlet of the gas-liquid separator;

a switching valve body that is configured to be switched between a first valve position and a second valve position, the first valve position being a position in which the first connection passage communicates with the compressor connection passage while closing the second connection passage, the second valve position being a position in which the second connection passage communicates with the compressor connection passage while closing the first connection passage;

an urging member that urges the switching valve body toward the second valve position; and a pressure-chamber formation portion that is provided with a pressure chamber into which the refrigerant flowing out of the gas-phase refrigerant outlet of the gas-liquid separator is introduced, the pressure-chamber formation portion being adapted to cause a refrigerant pressure in the pressure chamber to press the switching valve body toward the first valve position against the urging member, the urging member is configured to cause the switching valve body to be switched to the first valve position by the refrigerant pressure in the pressure chamber when the refrigerant pressure in the pressure chamber takes a value that brings the first decompression portion into the open state, and the urging member is configured to cause the switching valve body to be switched to the second valve position when the refrigerant pressure in the pressure chamber takes a value that brings the first decompression portion into the decompression state.

5. The refrigeration cycle device according to claim 1, further comprising:

a subcooler disposed between the liquid-phase refrigerant outlet of the gas-liquid separator and the second decompression portion, the subcooler being adapted to subcool the refrigerant flowing out of the liquid-phase refrigerant outlet, wherein the exterior heat exchanger and the subcooler are integral.

6. The refrigeration cycle device according to claim 1, wherein the exterior heat exchanger and the gas-liquid separator are integral.

* * * * *